US012509975B2

(12) United States Patent  
McClure

(10) Patent No.: US 12,509,975 B2  
(45) Date of Patent: Dec. 30, 2025

(54) SYSTEMS AND METHODS FOR HYDRAULIC FRACTURE AND RESERVOIR SIMULATION

(71) Applicant: ResFrac Corporation, Palo Alto, CA (US)

(72) Inventor: Mark W. McClure, Palo Alto, CA (US)

(73) Assignee: ResFrac Corporation, Palo Alto, CA (US)

( * ) Notice: Subject to any disclaimer, the term of this patent is extended or adjusted under 35 U.S.C. 154(b) by 924 days.

(21) Appl. No.: 17/537,901

(22) Filed: Nov. 30, 2021

(65) Prior Publication Data

US 2022/0127940 A1 Apr. 28, 2022

Related U.S. Application Data

(63) Continuation-in-part of application No. 16/991,727, filed on Aug. 12, 2020, now abandoned, and a (Continued)

(51) Int. Cl.
| | |
|---|---|
| *E21B 43/26* | (2006.01) |
| *E21B 47/002* | (2012.01) |
| *E21B 49/00* | (2006.01) |

(52) U.S. Cl.  
CPC .......... *E21B 43/26* (2013.01); *E21B 47/0025* (2020.05); *E21B 49/008* (2013.01); *E21B 2200/20* (2020.05)

(58) Field of Classification Search  
CPC .... E21B 43/26; E21B 47/0025; E21B 49/008; E21B 2200/20

(Continued)

(56) References Cited

U.S. PATENT DOCUMENTS

| | | |
|---|---|---|
| 9,540,911 B2 | 1/2017 | Stone et al. |
| 10,954,757 B2 | 3/2021 | Shetty et al. |

(Continued)

FOREIGN PATENT DOCUMENTS

| | | | |
|---|---|---|---|
| CA | 2240580 A1 * | 12/1999 | ............ B09B 1/008 |
| CN | 102575510 A | 7/2012 | |

(Continued)

OTHER PUBLICATIONS

Oballa_1990 (Adaptive-Implicit Method in Thermal Simulation, SPE Reservoir Engineering, Nov. 1990). (Year: 1990).*

(Continued)

*Primary Examiner* — Brian S Cook  
(74) *Attorney, Agent, or Firm* — Wilson Sonsini Goodrich & Rosati

(57) ABSTRACT

Provided herein are systems and methods for modeling and simulating reservoir, wellbore, and hydraulic fracturing. The systems and methods provided herein may facilitate well life cycle simulation by integrating a three-dimensional model representative of hydraulic fracturing and fluid flow in a wellbore and reservoir. The systems and methods may couple fluid flow in the wellbore and reservoir during injection and extraction with propagation of fractures through subsurface materials during fluid injection. Integrated three-dimensional reservoir, wellbore, and hydraulic fracture simulation may be useful for the design of hydraulic fracture treatments and prediction of future reservoir production.

20 Claims, 19 Drawing Sheets

Related U.S. Application Data continuation-in-part of application No. 16/359,498, filed on Mar. 20, 2019, now Pat. No. 11,225,855, said application No. 16/991,727 is a continuation-in-part of application No. PCT/US2019/023216, filed on Mar. 20, 2019.

(60) Provisional application No. 62/646,150, filed on Mar. 21, 2018.

(58) Field of Classification Search
USPC .......................................................... 703/10
See application file for complete search history.

(56) References Cited

U.S. PATENT DOCUMENTS

| | | | |
|---|---|---|---|
| 11,220,889 B2 | 1/2022 | McClure | |
| 11,225,855 B2 | 1/2022 | McClure | |
| 2004/0199329 A1 | 10/2004 | Stone | |
| 2009/0164189 A1 | 6/2009 | Bourbiaux | |
| 2011/0024125 A1 | 2/2011 | Wallace et al. | |
| 2011/0257944 A1* | 10/2011 | Du | E21B 43/267 703/2 |
| 2013/0073268 A1 | 3/2013 | Abacioglu et al. | |
| 2013/0238304 A1 | 9/2013 | Glinsky | |
| 2013/0346035 A1 | 12/2013 | Madasu et al. | |
| 2014/0151033 A1 | 6/2014 | Xu | |
| 2014/0222403 A1 | 8/2014 | Lepage et al. | |
| 2014/0297235 A1 | 10/2014 | Arora et al. | |
| 2014/0372089 A1 | 12/2014 | Weng et al. | |
| 2016/0010443 A1 | 1/2016 | Xu | |
| 2016/0123118 A1 | 5/2016 | Downton et al. | |
| 2016/0283651 A1 | 9/2016 | Knight et al. | |
| 2017/0002652 A1 | 1/2017 | Kampfer et al. | |
| 2017/0030166 A1 | 2/2017 | Shen et al. | |
| 2017/0275970 A1 | 9/2017 | Crawford et al. | |
| 2017/0315266 A1 | 11/2017 | Myers et al. | |
| 2017/0328179 A1 | 11/2017 | Dykstra et al. | |
| 2018/0010429 A1 | 1/2018 | Willberg et al. | |
| 2018/0058212 A1 | 3/2018 | Ali et al. | |
| 2018/0252102 A1 | 9/2018 | Anschutz et al. | |
| 2019/0292884 A1 | 9/2019 | Mcclure | |
| 2020/0032623 A1 | 1/2020 | McClure | |
| 2020/0371262 A1 | 11/2020 | McClure | |

FOREIGN PATENT DOCUMENTS

| | | | |
|---|---|---|---|
| CN | 105452599 A | 3/2016 | |
| CN | 106844909 A | 6/2017 | |
| EP | 3101225 A1 | 12/2016 | |
| FR | 3000579 A1 | 7/2014 | |
| FR | 3036210 A1 | 11/2016 | |
| WO | WO-2011081544 A1 | 7/2011 | |
| WO | WO-2016032489 A1 | 3/2016 | |
| WO | WO-2016183043 A1 | 11/2016 | |
| WO | WO-2017059152 A1 | 4/2017 | |
| WO | WO-2017078671 A1 | 5/2017 | |
| WO | WO-2017078674 A1 | 5/2017 | |
| WO | WO-2017082862 A1 | 5/2017 | |
| WO | WO-2017216594 A1 | 12/2017 | |
| WO | WO-2018033524 A1 | 2/2018 | |
| WO | WO-2018165352 A1 * | 9/2018 | ............. E21B 43/12 |
| WO | WO-2019183252 A1 | 9/2019 | |

OTHER PUBLICATIONS

Mcclure et al. A three-dimensional reservoir, wellbore, and hydraulic fracturing simulator that is compositional and thermal, tracks proppant and water solute transport, includes non-darcy and non-newtonian flow, and handles fracture closure. Society of Petroleum Engineers. pp. 1-43. (2017).

Mcclure et al. ResFrac technical writeup. pp. 1-54. (Latest version—2019).

PCT/US2019/023216 International Search Report dated Jul. 11, 2019.

US 20040199329 Al, a compressed version, Oct. 2004.

US 20110024125 Al, a compressed version, Feb. 2011.

U.S. Appl. No. 16/359,498 Notice of Allowance dated Sep. 27, 2021.

U.S. Appl. No. 16/359,498 Office Action dated Jun. 30, 2021.

U.S. Appl. No. 16/507,638 Notice of Allowance dated Oct. 20, 2021.

U.S. Appl. No. 16/507,638 Office Action dated Jul. 2, 2021.

U.S. Appl. No. 16/991,727 Office Action dated Sep. 14, 2021.

U.S. Appl. No. 16/359,498 Notice of Allowance dated Nov. 10, 2021.

U.S. Appl. No. 16/359,498 Notice of Allowance dated Nov. 23, 2021.

U.S. Appl. No. 16/507,638 Notice of Allowance dated Nov. 10, 2021.

EP19770871.2 Extended European Search Report dated Nov. 26, 2021.

* cited by examiner

| X | X | X | X | Element 1, Residual 1 |
| X | X | X | X | Element 1, Residual 2 |
| X | X | X | X | Element 2, Residual 1 |
| X | X | X | X | Element 2, Residual 2 |

*FIG. 3A*

| X | X | X |   | Element 1, Residual 1 |
| X | X | X |   | Element 1, Residual 2 |
| X |   | X | X | Element 2, Residual 1 |
| X |   | X | X | Element 2, Residual 2 |

*FIG. 3B*

| X | X | Element 1, Residual 1* |
| X | X | Element 2, Residual 1* |

SYSTEMS AND METHODS FOR HYDRAULIC FRACTURE AND RESERVOIR SIMULATION

CROSS REFERENCE

This application is a Continuation-in-Part application of U.S. application Ser. No. 16/359,498 filed on Mar. 20, 2019 which claims priority to U.S. Provisional Application No. 62/646,150, filed on Mar. 21, 2018, and a Continuation-in-Part application of U.S. application Ser. No. 16/991,727 filed on Aug. 12, 2020 which claims priority to International Application No. PCT/US2019/023216, filed on Mar. 20, 2019, which claims priority to U.S. Provisional Application No. 62/646,150, filed on Mar. 21, 2018, each of which is entirely incorporated herein by reference.

BACKGROUND

Reservoir simulation is used in subsurface engineering to predict fluid flow during injection of fluid into the reservoir and extraction of fluid from the reservoir. Reservoir simulation is used to in the petroleum industry to predict future production of a reservoir and to optimize hydrocarbon recovery. Related fields use reservoir simulation to model geothermal energy, carbon dioxide sequestration, and groundwater hydrology. Hydraulic fracture simulation is also used in subsurface engineering to describe and predict the propagation of fractures through rock during injection of fracturing fluids. Hydraulic fracture simulators generally focus on the geomechanics of crack propagation and transport of proppant through the fracture. Integration of reservoir and hydraulic fracture simulation may be challenging due to the difference in timescales of the changes that occur within the respective simulation models.

SUMMARY

Recognized herein is the need for computer-implemented systems and methods for integrated three-dimensional simulation of reservoir flow, wellbore flow, and hydraulic fracturing. The systems and methods may couple fluid flow in the wellbore and reservoir during injection and extraction with propagation of fractures through subsurface materials during fluid injection. Integrated three-dimensional reservoir, wellbore, and hydraulic fracture simulation may be useful for the design of hydraulic fracture treatments and prediction of future reservoir production.

In an aspect, the present disclosure provides a method for determining hydraulic fracture treatment of a production well. The method comprises: receiving one or more input parameters for a production well, wherein at least one of the one or more input parameters are based on data from an integrated three-dimensional (3-D) model of a calibration well; performing an integrated 3-D simulation of hydraulic fracturing and fluid flow in a wellbore and reservoir of the production well based on the one or more input parameters for the production well, wherein performing the integrated 3-D simulation comprises: i) creating an integrated 3-D model representative of the hydraulic fracturing and the fluid flow in the wellbore and the reservoir of the production well, ii) adaptively treating a component of the 3-D model as explicit or implicit with respect to a time step; and outputting the hydraulic fracture treatment of the production well based on the integrated 3-D simulation of hydraulic fracturing and fluid flow in the wellbore and reservoir of the production well.

In some embodiments, adaptively treating the component of the 3-D model as explicit or implicit comprises assigning the component as explicit or implicit based on numerical instability of the component. In some embodiments, the one or more input parameters comprise one or more hydraulic fracture treatment conditions of the production well. In some cases, the one or more hydraulic fracture treatment conditions of the production well include (i) spacing of perforation clusters, (ii) spacing between wells, (iii) amount of proppant injected into a perforation cluster, (iv) injection rate, (v) injection volume, (vi) length of each stage along the production well, (vii) type of proppant injected, (viii) type of fluid injected, (ix) sequencing of fluid and proppant injection during a stage, or (x) sequencing of injection stages.

In some embodiments, the one or more input parameters comprise a model parameter modified based on the data from the integrated 3-D model of a calibration well. In some cases, the model parameter is modified based on a comparison between the model parameter and a production data from the integrated 3-D model of a calibration well. In some instances, the production data includes production rate, production pressure, injection pressure during fracturing, or fracture length.

In an aspect, the present disclosure provides a system for determining hydraulic fracture treatment of a production well, comprising: one or more processors; a graphical user interface communicatively coupled to the one or more processors; and a memory, communicatively coupled to the one or more processors and the graphical user interface, including instructions executable by the one or more processors, individually or collectively, to implement and to present on the graphical user interface a method for determining hydraulic fracture treatment, the method comprising: receiving, from a user via the graphical user interface, one or more input parameters comprising (i) hydraulic fracture treatment conditions of a calibration well, (ii) geological data from an area containing the calibration well, (iii) data from one or more sensors disposed at the calibration well, or (iv) production data of oil or gas from the calibration well; providing, to the user on the graphical user interface, an integrated three-dimensional (3-D) model of hydraulic fracturing and fluid flow in a wellbore and reservoir of the calibration well; receiving, from the user via the graphical user interface, one or more hydraulic fracture treatment conditions for the production well; inputting the one or more hydraulic fracture treatment conditions for the production well into the integrated 3-D model to generate an integrated 3-D simulation of hydraulic fracturing and fluid flow in a wellbore and reservoir of the production well; and displaying, to the user on the graphical user interface, the integrated 3-D simulation of hydraulic fracturing and fluid flow in the wellbore and reservoir of the production well.

In some embodiments, the one or more hydraulic fracture treatment conditions of the production well include (i) spacing of perforation clusters, (ii) spacing between wells, (iii) amount of proppant injected into a perforation cluster, (iv) injection rate, (v) injection volume, (vi) length of each stage along the production well, (vii) type of proppant injected, (viii) type of fluid injected, (ix) sequencing of fluid and proppant injection during a stage, or (x) sequencing of injection stages. In some embodiments, the calibration well is disposed adjacent to or in the same geological formation as the production well.

In some embodiments, the one or more input parameters are provided to the one or more processors as an input file. In some embodiments, the integrated 3-D simulation simulates fracture growth and the transport of water, oil, gas, and proppant through the wellbore and reservoir of the production well. In some embodiments, the one or more processors compares model predictions from the 3-D model of the calibration well to production data from the calibration well. In some embodiments, the production data includes production rate, production pressure, injection pressure during fracturing, or fracture length. In some embodiments, the integrated 3-D model provides a sensitivity analysis for the geological data. In some embodiments, the geological data includes permeability or fracture conductivity. In some embodiments, the integrated 3-D model assesses which of the one or more input parameters have the largest impact on performance of the integrated 3-D simulation.

In some embodiments, the system displays to a user via the graphical user interface one or more output properties representing the response and state of the production well at a given time. In some embodiments, the one or more output properties are selected from the group consisting of fluid pressure, temperature, fluid saturation, molar composition, fluid phase density, fluid phase viscosity, proppant volume fraction, and fracture aperture. In some embodiments, wherein the system displays to a user via the graphical user interface one or more output properties representing the response and state of the production well at a given time. In some embodiments, the one or more inputs further comprise production boundary conditions. In some embodiments, the one or more hydraulic fracture treatment conditions for the production well are provided to the processor as an input file. In some embodiments, the input file is generated by a user with the assistance of the graphical user interface.

In another aspect, the present disclosure provides a system for determining hydraulic fracture treatment of a production well, comprising: a server in communication with a user device configured to permit a user to simulate, in three-dimensions (3-D), a wellbore and reservoir of a production well, wherein the server comprises: (i) a memory for storing a set of software instructions, and (ii) one or more processors configured to execute the set of software instructions to: receive one or more input parameters comprising (1) hydraulic fracture treatment conditions of a calibration well, (2) geological data from an area containing the calibration well, (3) data from one or more sensors disposed at the calibration well, or (4) production data of oil or gas from the calibration well; provide to the user device an integrated 3-D model of hydraulic fracturing and fluid flow in a wellbore and reservoir of the calibration well; receive from the user device one or more hydraulic fracture treatment conditions for the production well; input the one or more hydraulic fracture treatment conditions for the production well into the integrated 3-D model to generate an integrated 3-D simulation of hydraulic fracturing and fluid flow in a wellbore and reservoir of the production well; and display, on the user device, an integrated 3-D simulation of hydraulic fracturing and fluid flow in the wellbore and reservoir of the production well.

In some embodiments, the one or more hydraulic fracture treatment conditions of the production well include (i) spacing of perforation clusters, (ii) spacing between wells, (iii) amount of proppant injected into a perforation cluster, (iv) injection rate, (v) injection volume, (vi) length of each stage along the production well, (vii) type of proppant injected, (viii) type of fluid injected, (ix) sequencing of fluid and proppant injection during a stage, or (x) sequencing of injection stages. In some embodiments, the calibration well is disposed adjacent to or in the same geological formation as the production well.

In some embodiments, the one or more input parameters are provided to the one or more processors as an input file. In some embodiments, the integrated 3-D simulation simulates fracture growth and the transport of water, oil, gas, and proppant through the wellbore and reservoir of the production well. In some embodiments, the one or more processors compares model predictions from the 3-D model of the calibration well to production data from the calibration well. In some embodiments, the production data includes production rate, production pressure, injection pressure during fracturing, or fracture length. In some embodiments, the integrated 3-D model provides a sensitivity analysis for the geological data. In some embodiments, the geological data includes permeability or fracture conductivity. In some embodiments, the integrated 3-D model assesses which of the one or more input parameters have the largest impact on performance of the integrated 3-D simulation.

In some embodiments, the system displays to a user, via the graphical user interface, one or more output properties representing the response and state of the production well at a given time. In some embodiments, the one or more output properties are selected from the group consisting of fluid pressure, temperature, fluid saturation, molar composition, fluid phase density, fluid phase viscosity, proppant volume fraction, and fracture aperture. In some embodiments, the system displays to a user via the graphical user interface one or more output properties representing the response and state of the production well at a given time. In some embodiments, the one or more inputs further comprise production boundary conditions. In some embodiments, the one or more hydraulic fracture treatment conditions for the production well are provided to the processor as an input file. In some embodiments, the input file is generated by a user with the assistance of the graphical user interface.

In another aspect, the present disclosure provides a method for determining hydraulic fracture treatment of a production well, comprising: providing one or more input parameters comprising (i) hydraulic fracture treatment conditions of a calibration well, (ii) geological data from an area containing the calibration well, (iii) data from one or more sensors disposed at the calibration well, or (iv) production data of oil or gas from the calibration well to one or more processors, wherein the one or more processors are communicatively coupled to a graphical user interface and a memory including instructions executable by the one or more processors; generating an integrated three-dimensional (3-D) model representative of hydraulic fracturing and fluid flow in a wellbore and reservoir of the calibration well; providing one or more hydraulic fracture treatment conditions for the production well to the one or more processors; inputting the one or more hydraulic fracture treatment conditions for the production well into the integrated 3-D model to generate an integrated 3-D simulation of hydraulic fracturing and fluid flow in a wellbore and reservoir of the production well; and displaying, on the graphical user interface, an integrated 3-D simulation of hydraulic fracturing and fluid flow in the wellbore and reservoir of the production well.

In some embodiments, the method further comprises collecting data from the calibration well, wherein the one or more input parameters comprises the data collected from the calibration well. In some embodiments, the data is measured, derived, or estimated from well logs, core data, or seismic data. In some embodiments, the integrated 3-D simulation simulates fracture growth and the transport of water, oil, gas, and proppant through the wellbore and reservoir of the production well.

In some embodiments, the method further comprises using the integrated 3-D simulation of hydraulic fracturing and fluid flow in the wellbore and reservoir of the production well to determine the hydraulic fracturing treatment conditions and/or to predict future reservoir production of the production well. In some embodiments, the method further comprises comparing data generate by the 3-D model of the calibration well to production data from the calibration well. In some embodiments, the method further comprises modifying the one or more input parameters to generate data from the 3-D model of the calibration well that is within about 10 to 20 percent of the production data. In some embodiments, the production data includes production rate and pressure, injection pressure during fracturing, or fracture length. In some embodiments, the one or more input parameters that are modified include formation permeability, fracture conductivity, relative permeability curves, effective fracture toughness, in-situ stress state, porosity, Young's modulus, Poisson's ratio, fluid saturation, and tables of pressure dependent permeability multipliers.

In some embodiments, the reservoir of the calibration well and production well comprises a matrix and fractures, and wherein the integrated 3-D model and the integrated 3-D simulation comprises matrix elements, fracture elements, and wellbore elements for modeling and/or simulating multiphase flow and energy transfer in the matrix, fractures, and wellbore. In some embodiments, the matrix elements, fracture elements, and wellbore elements each comprise one or more components. In some embodiments, the one or more components are explicit components or implicit components, and wherein explicit components and implicit components are treated with explicit or implicit time stepping, respectively. In some embodiments, the method further comprises using the one or more processors to solve the explicit components to obtain explicit variables and using the explicit components and explicit variables to solve the implicit components to obtain implicit variables. In some embodiments, the method further comprises coupling the explicit components and implicit component of the matrix elements, fracture elements, and wellbore elements and using the one or more processors to simultaneously solve the matrix elements, fracture elements, and wellbore elements to obtain the integrated 3-D model and/or the integrated 3-D simulation of hydraulic fracture and fluid flow in the wellbore and reservoir of the calibration well and/or the production well. In some embodiments, the method further comprises using numerical differentiation to approximate derivatives of the implicit components with respect to the implicit variables, and wherein the implicit components are evaluated after substitution of the explicit variables into the implicit components.

In some embodiments, the one or more hydraulic fracture treatment conditions of the production well include (i) spacing of perforation clusters, (ii) spacing between wells, (iii) amount of proppant injected into a perforation cluster, (iv) injection rate, (v) injection volume, (vi) length of each stage along the production well, (vii) type of proppant injected, (viii) type of fluid injected, (ix) sequencing of fluid or proppant injection during a stage, or (x) sequencing of injection stages. In some embodiments, the calibration well is disposed adjacent to or in the same geological formation as the production well. In some embodiments, the method further comprises generating a sensitivity analysis for the geological data. In some embodiments, the method further comprises assessing which of the one or more input parameters have the largest impact on performance of the integrated 3-D simulation. In some embodiments, the method further comprises using the 3-D simulation to generate one or more output properties representing the response and state of the production well at a given time. In some embodiments, the one or more output properties are selected from the group consisting of fluid pressure, temperature, fluid saturation, molar composition, fluid phase density, fluid phase viscosity, proppant volume fraction, and fracture aperture. In some embodiments, the one or more inputs further comprise production boundary conditions. In some embodiments, the method further comprises treating the production well with the one or more hydraulic fracture treatment conditions to produce oil and/or gas.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIGS. 3A-3B show an example structures of Jacobian matrices for systems with two elements and two residuals per component; FIG. 3A shows an example structure of a Jacobian matrix that is fully implicit; FIG. 3B shows an example structure of a Jacobian matrix that uses an adaptive implicit method; FIG. 3C shows an example structure of a Jacobian matrix that uses an adaptive implicit method with variable substitution;

FIG. 13 shows an example of a graphical user interface (GUI) rendered on a display of a user device;

DETAILED DESCRIPTION

Figure 1:
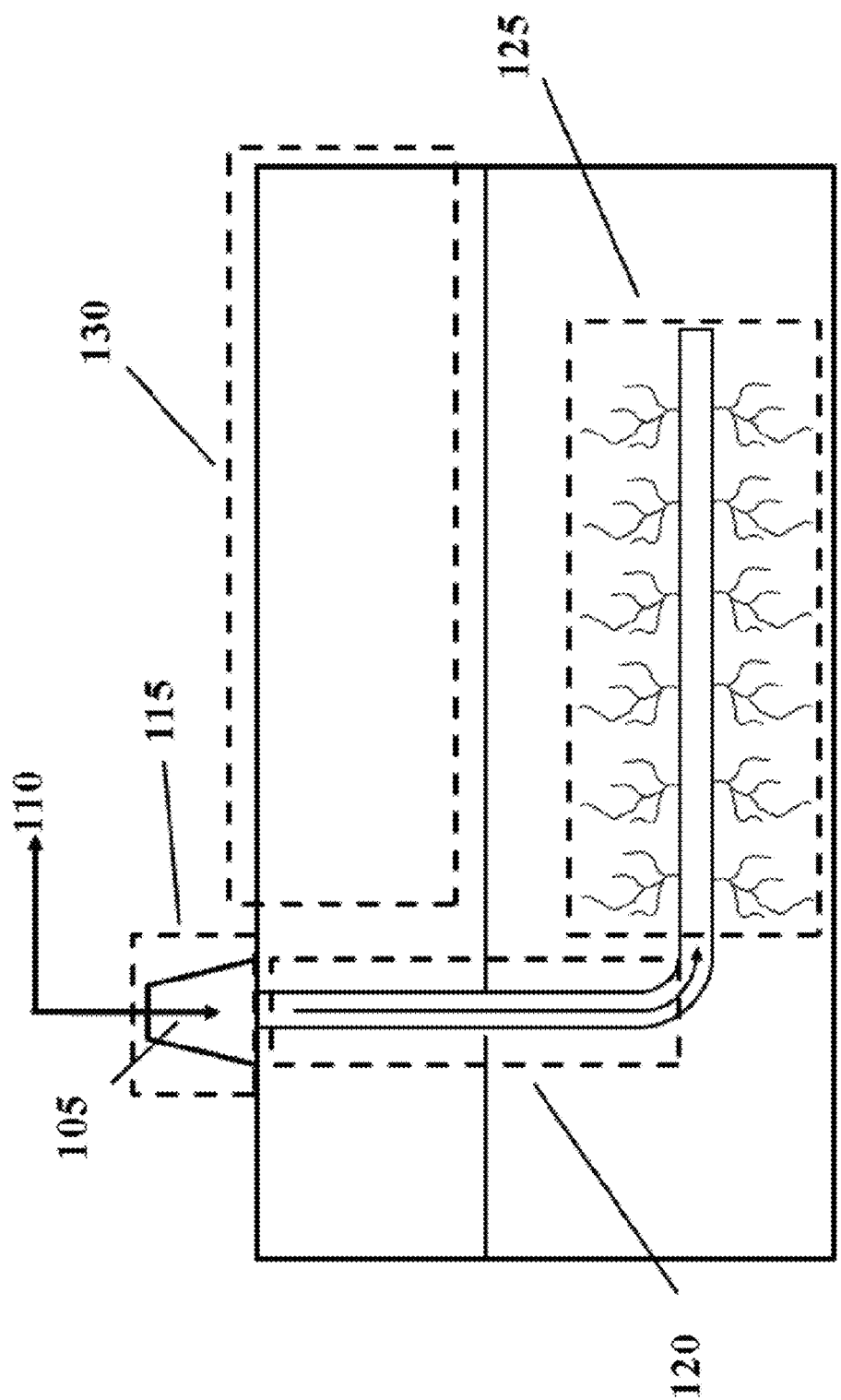
FIG. 1 shows a schematic illustration of a wellbore and reservoir for hydraulic fracture treatment and monitoring.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Design considerations applied to the production of oil and gas aided by hydraulic fracturing may include: (i) spacing of perforation clusters along a well, (ii) spacing between production wells, (iii) pounds of proppant pumped into each perforation cluster, (iv) injection rate, (v) injection volume, (vi) length of each stage along the well, (vii) type of proppant used, (viii) type of fluid used, (ix) sequencing of fluid and proppant injection during a stage (e.g., changes in rate, proppant concentration, and parameters over the course of injection), and/or (x) sequencing of injections between adjacent stages (e.g., zipperfrac or simulfrac). These design considerations may drive production costs and revenue, but are often made through trial and error.

Trial and error determination of design considerations may be both expensive and time consuming. For example, geological spatial variability may create randomness in well performance, which in turn may make it more difficult to achieve statistically significant comparisons between well. Additionally, multiple parameters may be changed simultaneously and, as such, it may be challenging to differentiate causes and effects. Computational simulation may be a tool to manage these difficulties. For example, computational models may simulate the physics of fracturing, including fracture growth and the transport of water, oil, gas, and proppant. Computational models may be used to investigate the physical processes and causal relationships during hydraulic fracturing, computationally test ideas prior to field testing, quantitatively optimize design variables, and identify key uncertainties in the fracturing process.

Reservoir simulation and hydraulic fracture simulation may be used to predict fluid flow during fluid injection and fluid extraction and to predict crack propagation and transport of proppant through the cracks, respectively. A variety of differential equations may be used to describe the behavior of the physical systems and may include governing principles such as conservation of mass, energy, and/or momentum. These differential equations may be solved analytically (e.g., using mathematical manipulations to determine closed-form solutions) or numerically (e.g., transforming the differential equations into algebraic equations that may be solved using a computer). Various numerical methods may be used to solve the differential equations and may be tailored to the specific application. Reservoir simulation may be performed by numerically solving the governing equations of the system (e.g., conservation of mass for different fluid components) and the constitutive equations that relate measured variables (e.g., pressure) to the governing equations. Hydraulic fracture simulation may be performed using governing equations related to the geomechanics of crack propagation and transport of proppant through the crack and may not describe flow in the matrix or multiphase flow.

Modeling hydraulic fracturing and reservoir and wellbore simulation together may be challenging because changes in the systems may occur on different timescales. For example, hydraulic fracture evolves rapidly during injection and fluid flow in the matrix may occur relatively slowly. Another challenge to modeling hydraulic fracturing and reservoir simulation together may be the complexity and diversity of the governing equations that form the model. The physical laws described by the governing equations may be nonlinear and, therefore, difficult to solve. However, integrating or coupling hydraulic fracturing simulation with reservoir and wellbore simulation may provide for a tool to aid in the design of hydraulic fracturing treatments and predicting future production of the reservoir. For example, the combined reservoir, wellbore, and fracture simulation may enable comparison of proposed fracture designs on the basis of the predicted production, realistic simulation of pressure drawdown in the fracture during production, description of the processes involving tight coupling of production and stimulation (e.g., refracturing processes), and increase the efficiency of simulation.

Methods for integrated reservoir, wellbore, and fracture simulation are described in Mark W. McClure and Charles A. Kang, *Society of Petroleum Engineers*, Paper SPE 182593-MS, 20-22 Feb. 2017 and Mark W. McClure and Charles A. Kang, *ResFrac Technical Writeup*, Geophysics, arXiv:1804.02092 [physics.geo-ph], each of which are entirely incorporated herein by reference. Additionally, combining reservoir simulation and hydraulic fracturing simulation may enable evaluation of proposed fracturing designs on the basis of predicted ultimate recovery rather than imperfect proxies such as the size of the stimulated rock volume, quantification of depletion effect on refractured wells or wells near previously depleted wells, and resolution between complex interactions between flow and fracture processes that may not be possible to resolve by separate reservoir and hydraulic fracture simulations.

Simulation of the wellbore and reservoir may be done with a fully implicit method or adaptive implicit method. A fully implicit method of simulating the wellbore and reservoir may be computationally inefficient for wellbore and hydraulic fracture simulation as it expends a large amount of computational effort in calculating values that are changing slowly with respect to the time step duration. For example, during fracturing, properties may change rapidly in fracture elements near the well, while properties may change slowly in matric elements that are distant from the well. The adaptive implicit method (AIM) may increase computational efficiency by spending computational effort when needed, which may yield an order of magnitude reduction in runtime. Computational efficiency may be important for both simulation cost and convenience. For example, each portion of the simulation (e.g., calibrating the model and running each simulation with various treatment conditions) may take hours or days to reach a solution. If each portion of the simulation takes a large amount of time, the cost and time required to perform the simulation may become prohibitive. Simulation runtime may be reduced by simplifying the physics of the model or computation detail. For example, separate codes may be used for hydraulic fracturing and reservoir simulation. The separation of physics into different models greatly simplifies the implementation and reduces runtime. However, simplifying the physics and separating the models may result in the loss of important physical processes, which may lead to worse design optimization and suboptimal decision making. Thus, the use of computationally efficient methods that integrate hydraulic fracturing and reservoir simulation, as described herein, may be critical.

Systems and Methods for Determining Hydraulic Fracture Treatment Conditions

In an aspect, the present disclosure may provide a system for determining hydraulic fracture treatment of a production well. The system may comprise one or more processors, a graphical user interface communicatively coupled to the one or more processors, and a memory communicatively coupled to the one or more processors and the graphical user interface. The memory may include instructions executable by the one or more processors, individually or collectively, to implement and to present on the graphical user interface a method for determining hydraulic fracture treatment of a production well. The method may include receiving, from a user via the graphical user interface, one or more input parameters. Alternatively, or in addition to, the one or more input parameters may be uploaded directly and accessible to the processor without user input. The input parameters may include hydraulic fracture treatment conditions of a calibration well, geological data from an area containing the calibration well, data from one or more sensors disposed at the calibration well, production data of oil or gas (e.g., natural gas) from the calibration well, or any combination thereof. The system may provide, to the user on the graphical user interface, an integrated three-dimensional (3-D) model of hydraulic fracturing and fluid flow in a wellbore and reservoir of the calibration well. The system may receiving, from the user via the graphical user interface, one or more hydraulic fracture treatment conditions for the production well, which the one or more processors may input into the integrated 3-D model to generate an integrated 3-D simulation of hydraulic fracturing and fluid flow in a wellbore and reservoir of the production well. Alternatively, or in addition to, the one or more hydraulic fracture treatment conditions may be stored in a memory of the system and may be uploaded directly and accessible to the processor without user input. For example, the system may include a set of treatment conditions that it automatically employs to optimize production of oil and/or gas from the production well. The system may display, to the user on the graphical user interface, the integrated 3-D simulation of hydraulic fracturing and fluid flow in a wellbore and reservoir of the production well.

In another aspect, the present disclosure may provide a system for determining hydraulic fracture treatment of a production well. The system may comprise a server in communication with a user device configured to permit a user to simulate, in three-dimensions (3-D), a wellbore and reservoir of a production well. The server may comprise a memory for storing a set of software instructions and one or more processors configured to execute the set of software instructions. The software instructions may receive one or more input parameters. The input parameters may include hydraulic fracture treatment conditions of a calibration well, geological data from an area containing the calibration well, data from one or more sensors disposed at the calibration well, production data of oil or gas (e.g., natural gas) from the calibration well, or any combination thereof. The system may provide to the user device an integrated 3-D model of hydraulic fracturing and fluid flow in a wellbore and reservoir of the calibration well. The user device may provide to the system one or more hydraulic fracture treatment conditions for the production well which may be input into the integrated 3-D model to generate an integrated 3-D simulation of hydraulic fracturing and fluid flow in a wellbore and reservoir of the production well. The system may display, on the user device, the integrated 3-D simulation of hydraulic fracturing and fluid flow in a wellbore and reservoir of the production well.

In another aspect, the present disclosure may provide a method for determining hydraulic fracture treatment of a production well. The method may comprise providing one or more input parameters. The input parameters may include hydraulic fracture treatment conditions of a calibration well, geological data from an area containing the calibration well, data from one or more sensors disposed at the calibration well, production data of oil or gas from the calibration well to one or more processors, or any combination thereof. The one or more processors may be communicatively coupled to a graphical user interface and a memory including instructions executable by the one or more processors. The one or more processors may generate an integrated 3-D model representative of hydraulic fracturing and fluid flow in a wellbore and reservoir of the calibration well. One or more hydraulic fracture treatment conditions for the production well may be provided to the one or more processors. The one or more hydraulic fracture treatment conditions may be input into the integrated 3-D model to generate an integrated 3-D simulation of hydraulic fracturing and fluid flow in a wellbore and reservoir of the production well. The simulation results (e.g., graphical representations of production and physical conditions) may be displayed to a user on a graphical user interface. The graphical user interface may be on a display local to the user that initiated calibration of the model and simulation of the product well.

The method may include selecting one or more wells to use as a calibration well(s). The calibration well may be a well that has been completed and produced. The method may further comprise collecting data from the calibration well to be used to calibrate the model prior to simulation of the production well. The calibration well may be disposed adjacent to or in the same geological formation as the production well. The calibration well may be used to calibrate the model. Data from the calibration well may be used as one or more inputs to generate a 3-D model of the calibration well. The inputs may include hydraulic fracture treatment conditions, geological data from the area containing the calibration well, data from sensors disposed at or near the calibration well, and/or production data. The data may be used to generate a geological model of the formation containing the calibration well. A geological model may be a 3-D representation of the properties of the subsurface in a region of interest (e.g., a region of interest for hydraulic fracturing). The properties modeled may include, but are not limited to, porosity, permeability, stress, Young's modulus, fluid saturation, fracture toughness, Biot's coefficient, and porosity compressibility. The properties may be measured, derived, or estimated from a variety of sources, including well logs, core data, and seismic data. The porosity may range from about zero to thirty percent. The permeability may range from about 10,000,000 millidarcy (mD) to $1 \times 10^{-6}$ mD. The stress may be on the order of hundreds or thousands of pounds per square inch (psi). The Young's modulus may range from about $2 \times 10^5$ psi to $7 \times 10^6$ psi. The fluid saturation may range from zero to one hundred percent. The fracture toughness may range from about 1000 pounds per square inch per inch square (psi-in$^{1/2}$) to 10,000 psi-in$^{1/2}$. The porosity compressibility may range from about $3 \times 10^{-6}$ inverse pounds per square inch (psi$^{-1}$) to $10^{-1}$ psi$^{-1}$. Prior to operation, the simulator may perform validation checks on all user inputs. For example, if the inputs are physically impossible (e.g., such as a negative value for fluid saturation), the simulator may print an error message and terminate. In another example, if the inputs are not physically impossible, but outside typical bounds (e.g., such as a permeability equal to $10^9$ mD), the simulator may print a warning message and continue. The properties may be isotropic or anisotropic. For example, permeability and stress are usually assumed anisotropic and the lastic moduli, toughness, and Biot's coefficient are usually assumed isotropic. Some properties may not be directional and so categorize them as isotropic or anisotropic has no physical meaning. These properties include fluid saturation, porosity, and porosity compressibility. The properties may be defined in a 'layer cake' model that assumes lateral homogeneity or may be defined in a general 3-D model that does not assume lateral homogeneity. The geological model may also be defined by the relative permeability and capillary pressure curves, distributions of dual porosity fracture parameters, and table of reversible or irreversible pressure dependent permeability multipliers. The pressure dependent permeability multipliers may be inputted as tables of 'permeability multiplier' versus 'change from initial pressure.' For example, the user may specify that the permeability is constant until the pressure increases by 1000 psi, and then increases gradually to 5× the initial permeability once the pressure has increased by 3000 psi. These multipliers may be based on the pressure at the current time step (e.g., reversible multiplier) or based on the highest pressure reached in the element (e.g., irreversible multiplier). The relative permeability and pressure curve may be spatially variable or may not be spatially variable. In an example, the relative permeability and pressure curve are spatially variable. The dual porosity fracture parameters may include fracture spacing, matrix permeability, and a geometric shape factor.

FIG. 1 shows a schematic illustration of a wellbore and reservoir for hydraulic fracture treatment and data and/or property monitoring. The hydraulic fracturing fluid 105 may be injected into the wellbore 120 and reservoir 125 through the wellhead 115 using one or more pumps (e.g., high-pressure and/or high-volume pumps). The wellbore 120 may extend from the wellhead 115 to a gas reservoir in which the reservoir 125 is disposed in. The hydraulic fracturing fluid 105 may cause fractures within the reservoir 125 to generate free gas and oil 110. The gas and oil may be driven out of the reservoir 125 and wellbore 120 through the wellhead 115 using one or more pumps (e.g., high-pressure and/or high-volume pumps) to be collected for further processing and use. The pumps used for injection of the hydraulic fracturing fluid and collection of gas and/or oil may be three or four cylinder pumps configured for high-pressure and/or high volume fluid flow. The produced gas and/or oil may be separated from the hydraulic fracturing fluid using one or more gas processing units. The gas processing units may include one or more heaters or separators.

The well may be monitored throughout the life cycle of the well (e.g., drilling, fracturing, and production) and the monitored data may be used to design 3-D model of the calibration well and for simulation of the production well. Monitoring may include generation of data logs (e.g., injection schedule information), measuring physical properties of the well and surrounding area during the life cycle, and measuring production rates. For example, well monitoring may include generating data logs including amount of fracturing fluid used and oil/gas produced via monitoring injection and production at the wellhead 115. Additionally, well monitoring may include measuring and monitoring the temperature, pressure, and flow rate at the wellhead 115 and along the wellbore 120. Temperature, pressure, and flow rate along the wellbore may be measure by a variety of sensors, including fiber-optic cables disposed outside the wellbore casing, gauges conveyed by wireline or coiled tubing, or permanently installed downhole gauges. Fracture monitoring may include monitoring the injection profile, fracture propagation, fracture locations, and flow rates within the reservoir 125. Fracture monitoring may be permitted using tracers within the reservoir 125 and microseismic monitoring of the region surrounding the well 130. Further monitoring may include monitoring stress via stress monitors and monitoring seismic activity, for example, with a geophone. Tiltmeters and electromagnetic imaging may also be used to monitor seismic activity. Pressure observations in offset wells and stages may be used to infer fracture growth and geometry. Produced fluid samples may be analyzed to infer their formation of origin. One or more different types of sensors may be utilized in collecting data when monitoring the well. Data from the sensors may be obtained and stored in the data logs. Data from the sensors may be automatically transmitted to one or more memory storage units, which may include the data logs. Data logs may collect data from a combination of sensors. Sensors may comprise temperature sensors, pressure sensors, stress sensors, motion sensors, valve configurations, and/or optical sensors.

The injection schedule used to fracture the calibration well may be input into the model and production boundary conditions may be set. The injection schedule may include the injection rate, proppant concentration, proppant type, and fluid additive concentration as a function of time. The injection rate may range from about 1 barrel oil per minute (bbl/min) to 150 bbl/min. The proppant concentration may range from zero pounds per gallon (ppg) to 6 ppg. Proppant types may include silica sand, walnut hulls, natural sand glass, resin coated sand, sintered bauxite, sintered kaolin, and fused zirconia. Fluid additives may include linear polymer molecules (e.g., guar, hydroxypropyl guar, hydroxyethyl cellulose, carboxymethyl hydroxypropyl guar, etc.), polymer cross-linkers (e.g., borage or metallic-based cross-linkers), surfactants, acids (e.g., hydrochloric acid, hydrofluoric acid, acetic acid, formic acid, etc.), biocides, scale inhibitors, clay stabilizers, pH buffers, cross-link breakers, diverting agents, friction reducers, and fluid loss additives. Proppants and fluid additives may be stored separately (e.g., in one or more proppant, chemical additive, or fracturing fluid storage tanks) from the hydraulic fracturing fluid. The proppants and/or fluid additives may be mixed and/or combined (e.g., using a slurry blender or sand mixers) with the hydraulic fracturing fluid prior to injection. Fluid additives may be injected on the order of parts per million (ppm). Injection may be performed with water as the base fluid. Alternatively, or in addition to, injection may be performed with a hydrocarbon base fluid or with gas such as CO2 or nitrogen. If the base fluid is liquid, gas such as CO2 or nitrogen may be added, with or without foaming agents. In example injection schedule, proppant may be injected at a low concentration (e.g., from about 0.25 to about 0.5 pounds per gallon (ppg)) and increased over time. For example, within 10 s of minutes, proppant concentration may be increased to about 3.0 ppg to 6.0 ppg. Fluid and proppant type may be constant or may vary over time. For example, small diameter proppant (e.g., a 100 mesh proppant) may be injected initially followed by a larger diameter proppant (e.g., a 40 or 70 mesh proppant).

The production boundary conditions may specify the bottomhole pressure to calculate the production rate or specify the production rate and calculate the bottomhole pressure. The model predictions may be compared to available date from the calibration well (e.g., production rate and pressure, injection pressure during fracturing, and fracture length). If the model parameters are not consistent within approximately 10-20% of the production data, the model inputs may be modified. Error between the production data and the model data may be quantified by taking the root-mean squared difference between the modeled and actual production data. For example, the formation permeability, fracture conductivity, relative permeability curves, effective fracture toughness, in-situ stress state, porosity, Young's modulus, Poisson's ration, fluid saturation, and tables of pressure dependent permeability multipliers may be modified. Comparison and modification of the model input parameters may be repeated at least 1, 2, 3, 4, 5, 6, 8, 10, 12, 14, 16, 18, 20, 30, 40, 50, 60, 80, 100, or more times. Comparison and modification of the input parameters may be repeated until the model data is within about 30%, 20%, 15%, 10%, 8%, 6%, 5%, 4%, 3%, 2%, 1%, or less of the production data. Comparison and modification of the input data may be repeated until the model data is from about 1% to 2%, 1% to 3%, 1% to 4%, 1% to 6%, 1% to 8%, 1% to 10%, 1% to 15%, 1% to 20%, 1% to 30%, 2% to 3%, 2% to 4%, 2% to 6%, 2% to 8%, 2% to 10%, 2% to 15%, 2% to 20%, 2% to 30%, 3% to 4%, 3% to 6%, 3% to 8%, 3% to 10%, 3% to 15%, 3% to 20%, 3% to 30%, 4% to 6%, 4% to 8%, 4% to 10%, 4% to 15%, 4% to 20%, 4% to 30%, 6% to 8%, 6% to 10%, 6% to 15%, 6% to 20%, 6% to 30%, 8% to 10%, 8% to 15%, 8% to 20%, 8% to 30%, 10% to 15%, 10% to 20%, 10% to 30%, 15% to 20%, 15% to 30%, or 20% to 30% of the production data. In an example, comparison and modification of the input data is repeated until the model data is from about 10% to 20% of the production data.

The calibrated model may be used to conduct a sensitivity analysis of the system. For example, geologic parameters may be varied to assess the impact of the parameter on well performance. Geologic parameters may include permeability, fracture conductivity, relative permeability curves, effective fracture toughness, in-situ stress state, porosity, Young's modulus, Poisson's ratio, fluid saturation, and tables of pressure dependent permeability multipliers. The sensitivity analysis may be used to prioritize subsequent data collection from the calibration well(s).

The calibrated model may be used to simulate a variety of alternative fracture designs by varying parameters such as cluster spacing, stage length, well spacing, perforation diameter, perforation shots per cluster, proppant type, proppant mass, proppant diameter, injection fluid viscosity, injection rate, and sequencing of stages between adjacent wells (e.g., zipperfrac versus simulfrac). Strategies may be evaluated for mitigating interference between adjacent wells (e.g., parent/child wells in which a 'child' well is fracturing after a nearby 'parent' well has been produced for an extended period of time. Strategies may include refracturing the parent well, injecting into the parent well, injecting far-field diverters into the child well, and shutting in the parent well. The designs (e.g., hydraulic fracturing treatment conditions) may be compared to determine the conditions that provide the highest production or net present value in a production well. The hydraulic fracturing treatment conditions that provide the highest production or net present value may be applied to the production well to produce oil and gas. For example, the 3-D hydraulic fracture simulation may be used to test a variety of hydraulic fracture treatment conditions and the treatment conditions that provide the highest production of oil and/or gas or net present value of the production well may be applied to the production well to produce the oil and/or gas. Additionally the production data from the production well may be monitored during hydraulic fracturing (e.g., using one or more sensors or monitors described elsewhere herein) and the simulation may be used to generate additional hydraulic fracturing treatment conditions to improve the production or net present value. The simulation may output a variety of properties. The outputs may be displayed to a user on a graphical user interface in the form of discreet data points, charts, graphs, and/or 3-D renderings of the wellbore and reservoir. The outputs may be displayed in color and/or greyscale. The color and/or greyscale may indicate the magnitude of the output parameters (e.g., pressure, stress, molar composition, temperature, proppant fraction, etc.) at a given time and location within the reservoir or wellbore. The outputs may represent the response and state of the system at a given time. For example, the outputs may represent fracture growth and the transport of water, oil, gas, and proppant through the wellbore and reservoir of the production well. The properties may be calculated at every location throughout the model domain in a series of time steps. Each time step may represent one snapshot in time. The output properties may include, but are not limited to, fluid pressure, temperature, fluid saturation, molar composition of the water and hydrocarbon mixture, fluid phases density, fluid phase viscosity, proppant volume fraction, and fracture aperture. The fluid pressure may range from zero to about 20,000 psi. The temperature may range from about 80° F. to about 450° F. The fluid saturation may range from zero to one hundred percent. The molar composition may range from zero to one hundred percent. The fluid phase density may range from 1 kilogram per cubic meter ($kg/m^3$) to 1200 $kg/m^3$. The fluid phase viscosity may range from 0.01 centipoise (cp) to millions or centipoise or more. The proppant volume fraction may range from zero to one hundred percent. The fracture aperture may range from micrometers to centimeters. Alternatively, or in addition to, the simulation may output summary values for each wellbore. Summary values may include the production rate of oil, gas, and water, injection rate of water, wellhead pressure, bottomhole pressure, and temperature of the produced fluid. Alternatively, or in addition to, the simulation may output summary statistics for each fracture, such as the average aperture, approximate height and length of the fracture, and the average net pressure.

Figure 2:
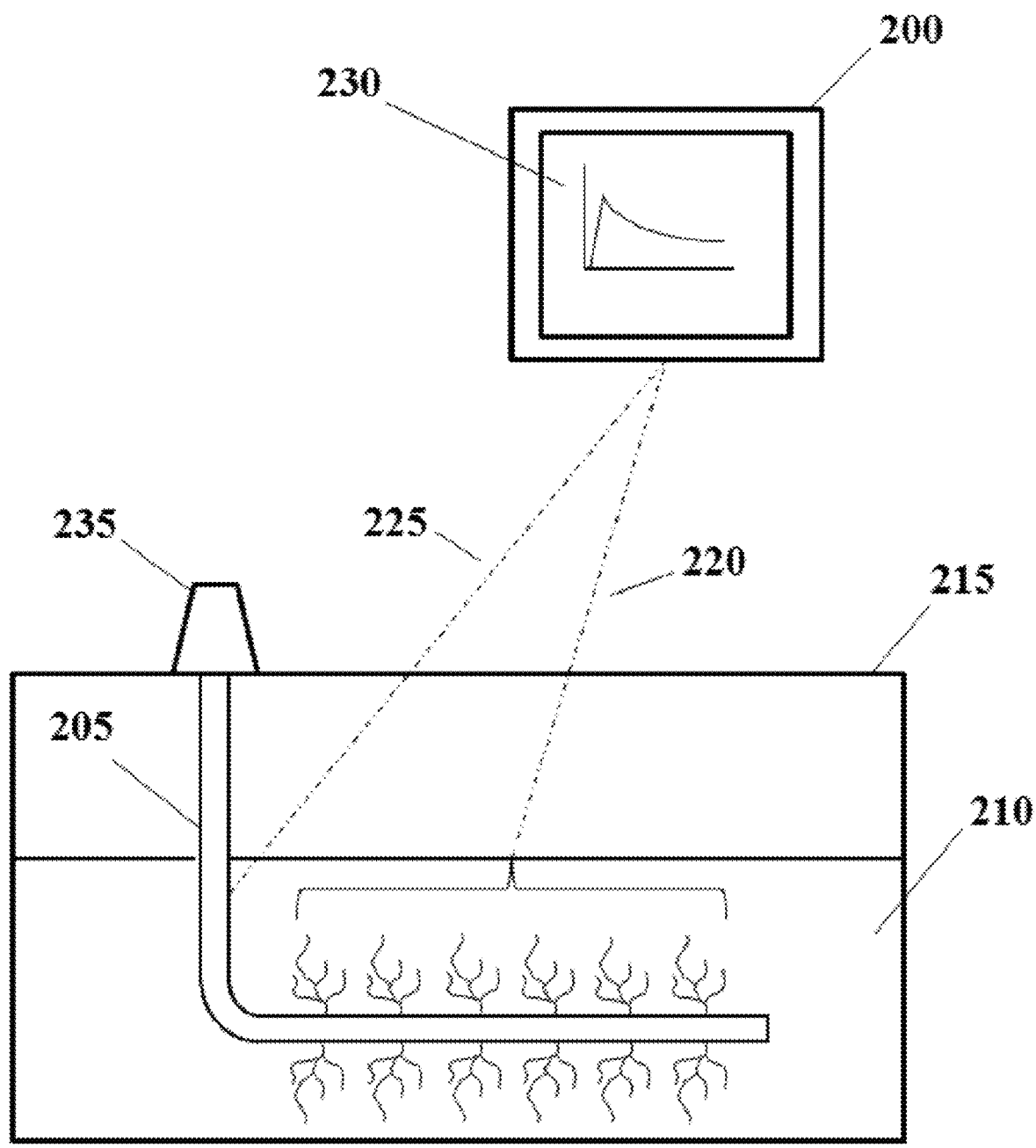
FIG. 2 shows a schematic illustration of a system for hydraulic fracture and simulation of a wellbore and reservoir during hydraulic fracture.

FIG. 2 shows a schematic illustration of a system for hydraulic fracture and reservoir simulation. The system may include a computer system 200 that is programmed or otherwise configured to simulate hydraulic fracture and fluid flow in a wellbore 205 and reservoir 210. The computer system (e.g., user device) 200 may include one or more processors, computer memory, and electronic storage. The hydraulic fracturing at a site 215 may be simulated by solving a variety of balance equations (e.g., components) in three types of elements, using variables defined by the fracturing site 215 and variables determined by the simulation. The elements may include fracture and matrix elements 220 and wellbore elements 225. The fracture and matrix elements 220 and wellbore elements 225 may include a variety of balance components (e.g., balance equations), such as proppant mass balance, component molar balance, etc. The simulation results 230 may be used to design the hydraulic fracturing treatments delivered to the wellbore 205 and reservoir 210 by the well head 235. For example, the hydraulic fracture treatment conditions used in the simulation (e.g., to generate the highest production rate and/or net production value) may be physically applied to a production well (e.g., the production well may be produced using the same treatment conditions as used in the simulation). For example, the results of the simulation may be used to determine the spacing between wells, the amount of proppant injected into a perforation cluster, the injection rate of the hydraulic fracturing fluid, the volume of injected hydraulic fracturing fluid, the length of each stage along the well, the type of proppant injected, the type of fluid injected, the sequencing of fluid an proppant injected during a stage, and/or the sequencing of the injection stages.

The inputs (e.g., properties from the calibration well and/or treatment conditions of the production well) may be specified in input filed and provided to the processor. The inputs may be manually input into the system by the user through a user interface (e.g., a graphical user interface). The processor may then generate the input file that is input into the model. Alternatively, or in addition to, the user may generate the input file to be input into the model. Alternatively, or in addition to, the inputs may be uploaded to the processor and memory without input from the user. For example, the hydraulic fracture treatment conditions of the calibration well, geological data from an area containing the calibration well, data from one or more sensors disposed at the calibration well, production data of oil or gas (e.g., natural gas) from the calibration well, or any combination thereof may uploaded and directly accessible to the system. For example, geographic data may be accessed from one or more sources (e.g., public survey information, etc) and uploaded for model calibration and simulation. Additionally, the system memory may include a listing of hydraulic fracture treatment conditions that it may input into the simulation without input from the user to optimize the treatment conditions. The input file may be an ASCII text file or a non-human-readable binary format. The simulation outputs may be exported to ASCII text files. Alternatively, or in addition to, the outputs may be exported as binary/hybrid files that are specialized to be read by a 3-D visualization tool. The binary/hybrid files may include a VTK format or other specialized visualization format.

The systems for simulating hydraulic fracturing may include one or more computer processors, computer memory, and one or more display units. The computer processors may be operatively coupled to the computer memory and/or the one or more display units. The method may include creating an integrated three-dimensional model representative of hydraulic fracturing and fluid flow in the wellbore and the reservoir. The reservoir may include a matrix and fractures. The three-dimensional model may include implicit components (e.g., equations), explicit components (e.g., equations), or both implicit and explicit equations. In this context, and in accordance with the nomenclature used in the field of reservoir simulation, implicit and explicit may refer to the treatment of variables and/or equations in the flow terms with respect to time. Explicit variables may be treated using values from the previous time step and implicit variables may be treated using values from the current time step. Matrix elements, fracture elements, and wellbore elements may be obtained (e.g., derived or selected) to model multiphase flow, energy transfer, and fracture formation in the wellbore and/or the reservoir. The matrix elements, fracture elements, and wellbore elements may each comprise one or more components (e.g., governing equations). Secondary element properties (e.g., density, viscosity, etc.) may be assigned for the matrix elements, fracture elements, and wellbore elements and stored in the computer memory. Each component (e.g., governing equation) for the matrix elements, fracture elements, and wellbore elements may be assigned as either explicit components or implicit and stored in the computer memory. The one or more computer processors may be used to solve the explicit components to obtain explicit variables. The explicit variables may be used to update the at least a portion of the stored secondary element properties. The explicit components and explicit variables may be used to solve the implicit components to obtain implicit variables. The implicit variables may be used to update at least another portion of the secondary element properties stored in the computer memory. The explicit and implicit components of the matrix elements, fracture elements, and wellbore elements may be coupled and the computer processors may be used to simultaneously solve the matrix elements, fracture elements, and wellbore elements to simulate hydraulic fracturing and fluid flow in the wellbore and reservoir. The simulation may be used to design hydraulic fracturing treatments and/or to predict future reservoir production.

The systems and methods may represent flow in the fracture with constitutive equations designed for fracture flow. When a fracture is mechanically opened, aperture distribution may be calculated using appropriate boundary conditions (e.g., fluid pressure equal to normal stress). Fracture propagation may be predicted using fracture mechanics. The wellbore may be included in, and integrated with, the simulation. The wellbore may be closely coupled to the reservoir such that wellbore transport affects reservoir processes. For example, during fracturing, fluid and proppant may flow out of the well from multiple perforation clusters and/or different fracture initiation points along an openhole interval. The relative amount of fluid and proppant distributed into each may depend on the perforation and friction pressure loss along the well. Additionally, proppant injection scheduling may depend upon the time to sweep injected proppant and fluid through the wellbore. The wellbore temperature may evolve rapidly during hydraulic fracturing as relatively cool fluid is injected into a relatively hot wellbore. Fluid temperature may affect viscosity and polymer cross-linking. Therefore, cooling in the near-wellbore region may induce thermoelestic stress changes.

The method may include modeling non-Newtonian fluid behavior. The non-Newtonian fluid behavior may be modeled with a modified power law (MPL) or power law fluid model. Alternatively, or in addition to, alternative rheological models may be used, such as the Herschel-Bulkley fluid model. In an example, the MPL may be because it models fluid using power law at high shear rates, as a Newtonian at low shear rates, and smoothly handles the transition between the two. Constitutive laws that depend on gel concentration and temperature may be used to define the rheological properties of the fluid. Using MPL and constitutive laws to model fluid behavior may enable simulation of fracturing treatments in which different fluid types are injected sequentially. The formation of filtercake on the fracture walls and the resulting obstruction flow may also be modeled. Filtercakes may be formed by large-molecules gels that are unable to penetrate the pores of the surrounding rock. A comprehensive model of proppant transport may be used. The model may include the effect of viscous drag, bulk gravitational convection of the slurry, gravitational settling, hindered settling, clustered settling, and effects of proppant slurry viscosity.

The model may include defining secondary variables. Secondary variables in each element of the system may be defined implicitly (e.g., residuals are evaluated by numerically solving nonlinear equations) or explicitly (e.g., using mathematical manipulations to determine closed-form solutions). In this context, the terms implicit and explicit may refer to whether a closed-form solution may be written to calculate the variable and may not indicate whether variables are calculated using values from the previous time step or current time step. As an example of a variable that is implicitly defined (e.g., a closed-form solution is not available), the viscosity of a non-Newtonian slurry containing proppant is a complex nonlinear function of flow velocity, but the flow velocity can be calculated from information related to the slurry viscosity. In this case, a closed-form solution cannot be obtained in which the flow velocity is isolated on one side of an equation. The flow velocity may be calculated using a numerical technique. Numerical techniques applied for reservoir simulation may involve calculation of derivatives of the residual equation, which may include numerous secondary variables. However, for a coupled or integrated reservoir and hydraulic fracturing simulation derivative calculation may be challenging due to the complexity and length of the analytical form of the component. The implicitly defined secondary variables in the residuals may further increase the difficulty of analytically deriving the derivatives.

Reservoir simulation may be performed using the finite difference or finite volume method to discretize space and the implicit Euler method to discretize time. The implicit Euler method may be unconditionally stable. Other methods (e.g., explicit Euler) may be more efficient, but may be numerically unstable and cause unphysical oscillations in the calculation results. Numerical instability may be avoided by using small time steps (e.g., a fine temporal discretization), however, this approach may reduce the computational efficiency of the simulation. Other methods may also be used to discretize time. One method may be the fully implicit method (FI) which used the implicit Euler method for all components of the elements. Another method for solving the reservoir simulation equations may be the implicit pressure, explicit saturation method (IMPES). In the IMPES, the pressure variables are solved implicitly in time and the saturation variables, and associated equations, in the flow terms are solved explicitly in time. The pressure equations may be vulnerable to numerical instability and the saturation equations may be less vulnerable to instability. Therefore, in some cases, the IMPES method may perform more efficiently than the fully implicit method, but the IMPES method may be vulnerable to numerical instability and the time step restrictions used to avoid instability may lead to lower simulation efficiency.

The model may include using adaptive implicit methods (AIM) to calibrate the model and simulate the production well. The AIM may include techniques used in both the FI and IMPES methods. For example, using AIM, some of the spatial distribution are discretized using the IMPES method and others are discretized with the FI methods. Various techniques may be used to predict which elements, variables, components, and/or properties may be prone to numerical instability. Elements, variables, components, and/or properties that are prone to numerical instability may be discretized using FI methods. The IMPES methods may be used with elements, variables, components, and/or properties that are not prone to numerical instability. As the simulation evolves through time and as the time step duration is varied, the assignment of each element, variable, component, and/or property may change from IMPES to FI or from FI to IMPES. AIM may increase the performance (e.g., efficiency, robustness, and accuracy) of the simulation. When a component is treated explicitly (e.g., saturation in the IMPES method), flow terms between elements may be evaluated using the value of the corresponding independent variable at the previous time step. When a component is treated implicitly (e.g., pressure in the IMPES method), flow terms between elements may be evaluated using the value of the corresponding independent variable at the current time step. For either explicit or implicit, the accumulation terms within each balance equation may be evaluated using the values from the current time step. The AIM method adaptively selects whether to treat variables in the flow terms with values from either the previous or current time step.

In each of the FI, IMPES, and AIM methods, N equations (or N components) may be represented by a residual vector, R, and N unknowns (or N variables) may be represented by a vector, x. In the AIM method, a subset of the equations or unknowns may be assigned and treated with the FI method and the remaining equations or unknowns may be treated with the IMPES method. The system may be solved by finding the values of x such that the values in R approximate to zero (e.g., within a pre-defined specific error tolerance). Other mixtures of implicit and explicit assignments may be used. For example, thermal components may include a mixture of implicit and explicit assignments and the remaining components and variables may be treated with the IMPES method. Alternatively, or in addition to, components may be used that is implicit with respect to pressure and saturation and explicit with respect to composition.

In an FI method, the system may, in some cases, be solved iteratively (e.g., using Newton-Raphson). A Jacobian matrix, J, may be assembled such that each term $J_{ij}$ is defined as:

$$J_{ij} = \frac{\partial R_i}{\partial x_j}. \tag{1}$$

The system of equations may be solved to find an updated vector dx. The updated vector dx may be used to update the unknowns as follows:

$$Jdx = -R, \qquad (2)$$

$$x^{(l+1)} = x^{(l)} + dx^{(l)}, \qquad (3)$$

where the superscripts (l) and (l+1) may denote the previous and new iterations, respectively. The nonlinear iterations may converge to the solution. For example, the solution may be reached when each value in R is close to (e.g., within a pre-defined error tolerance) zero or equal to zero. Alternatively, the nonlinear iteration may not converge to the solution. In a system that the iteration does not converge the value of the time step, Δt, may be decreased (e.g., the duration of the time step may be decreased). In a system that does not contain discontinuities in the residual equations, the system may converge if the time step is sufficiently small. The matrix J may be sparse because it may contain nonzero values for hydraulically connected elements and not elements that are not hydraulically connected. Each hydraulically connected element may be adjacent to a small subset of the total elements of the problem. The term 'hydraulically connected elements' may be used to refer to elements that are adjacent so that the pressure in one element directly affects the calculation of the residual equations (e.g., mass balance equations) in the other element.

In an AIM method, a Jacobian matrix, J, may be assembled and the derivatives, $$\frac{\partial R_i}{\partial x_j},$$

of the equations (e.g., components) that are treated explicitly may be set to zero. Accumulation terms relating $x_j$ to the other residual equations within the same element may not be set to zero. Linear algebraic manipulations may be performed such that the explicit variables and equations $R_j$ and $dx_j$ are decoupled from the system. For example, the rows of each IMPES element may be left-multiplied by the inverse of the block diagonal matrix corresponding to that element. The explicit rows and column may be removed from the matrix. The implicit variables, dx, may be calculated by solving the system of equations using the implicit equations and the explicit variables may be updated by back substitution into the rows of the matrix corresponding to the explicit equations. AIM may use the iterative process of equations (2) and (3) to update all of the unknowns in x, irrespective of whether they are implicit or explicit variables. This type of AIM implementation may have enhanced efficiency due to the explicit treatment of a portion of the variables in the flow terms which may allow many of the columns and rows in the Jacobian matrix to be removed from the matrix solution and updated after solving with back-substitution.

A computer-implemented method may be employed to handle the challenges of analytically deriving the derivatives. The computer-implemented method may solve the full set of governing equations (e.g., components) in a way that is efficient, numerically stable, accurate, and robust. The computer-implemented method may use a form of the adaptive implicit method (AIM) to solve the model elements (e.g., matrix elements, fracture elements, and wellbore elements). The method may apply the AIM in conjunction with a numerical approach to solve the model element and simulate hydraulic fracture and flow in the reservoir and wellbore. The method may include coupled simulation of hydraulic fracturing and reservoir simulation. Coupled simulation of hydraulic fracturing and reservoir simulation may include modeling processes that operate on different timescales. Therefore, coupling AIM and a numerical approach to solve the model elements may permit coupled flow of fluid components, thermal energy, water solutes, and proppant transport to be modeled in a single simulator. The method may include directly solving explicit components, using the solved explicit components to constrain the solutions of the implicit components, and using numerical differentiation to estimate any nonzero values in the resulting Jacobian matrix. The components may be assigned as implicit or explicit based on an estimate of which equations may be numerically unstable if treated explicitly. The numerical differentiation may simplify the process of calculating the derivatives and facilitate the solution of complex multiphysics elements that comprise implicitly defined components and variables. Additionally, directly solving the explicit components and using the explicitly defined components to constrain the implicitly defined components may reduce the number of derivatives that are explicitly calculated and improve the efficiency of solving the system.

The computer-implemented method for simulation of hydraulic fracturing and fluid flow in the wellbore and the reservoir may include the use of AIM in conjunction with variable substitution, numerical differentiation, or both variable substitution and numerical differentiation. Using AIM in conjunction with variable substitutions may enable solving a system of equations (e.g., the fracture, matrix, or wellbore components) at least in part with analytical manipulations. Using variable substitution, the explicit equations may be directly solved (e.g., analytically) and substituted into the residual during each iteration. Because of this, back-substitution may not be used to determine the updated dx for the explicit variables, unlike with the previously described AIM technique. Based on the value of x for the previous iteration, each explicit component j may be solved directly to find $x_j$ in terms of the other unknown variables. The expression for $x_j$ may then be directly input into the implicit residual equations for the same element, which modifies both the residual equation and the derivative values in the Jacobian matrix. The system of equations may then be solved to determine updates dx to the implicit variables, as in Equations (2) and (3) of the previously described AIM method. The analytical solution and updated dx explicit variables may not represent the final solution during the iteration process as the terms and variables may be dependent upon the implicit equations and implicit variables, which may be considered to be unknown until the system converges. Nevertheless, substituting the values of x into an explicit equation $R_j$ in the Jacobian matrix may yield residual of zero at each iteration.

In an example, the method may include representing a system of two equations and two unknowns by:

$$R = \begin{bmatrix} R_1 \\ R_2 \end{bmatrix} = \begin{bmatrix} x_2^2 + x_1 - 10 \\ x_1^2 + 2x_2 - 10 \end{bmatrix}, \qquad (4)$$

where $(x_1, x_2)$ may be initially estimated as (1,2). Using the Newton method and previously described Equations (2) and (3) this system may converge within five iterations to the machine precision solution of (2.0918, 2.8121). Alternatively, equation $R_2$ may be solved for $x_2$ in terms of $x_1$ and substituted into equation $R_1$ to form a modified residual equation $R_1^*$. Thus, in this example, the number of residual equations is reduced to one and the updated $x_1$ variable may be calculated using Equations (2) and (3) with $R_1^*$ to obtain:

$$\Delta x = -\left(\frac{\partial R_1^*}{dx_1}\right)^{-1} R_1^*. \quad (5)$$

The derivative of Equation (5) is:

$$\frac{\partial R_1^*}{\partial x_1} = \frac{\partial R_1}{\partial x_1} + \frac{\partial R_1}{\partial x_2}\frac{\partial x_2}{\partial x_1}. \quad (6)$$

Once the $x_1$ variable is updated, the value of $x_2$ may be directly calculated by solving $R_2$ for $x_2$. Because of this, the value of $R_2$ may go to zero after a single iteration. However, the calculated value of $x_2$ may not be the final or correct solution for $x_2$ after a single iteration because the calculated value of $x_2$ is dependent upon $x_1$, which may not have reached convergence. Applying the updated values from Equations (5) and (6) may yield the same solution to machine precision within five iterations, the same as the previously described Newton method. However, the steps taken for each iteration may differ from the standard Newton method applied directly to Equation (4).

Though the above described adaptive AIM method includes an algebraic manipulation of the original Jacobian, the residual equations are nonlinear and substitution of $x_2$ into $R_1$ may include that nonlinearity. For example, in this case, the solution for $x_2$ yields:

$$x_2 = \frac{10 - x_1^2}{2} \quad (7)$$

While this substitution may be performed algebraically, it may not be accomplished solely from linear manipulations on the original Jacobian matrix.

The above described solution strategy may be used to eliminate equations from the Jacobian in conjunction with a fully implicit method. An explicit equation $R_j$ may be solved for the corresponding variable $x_j$ and the variable $x_j$ may be substituted into each other residual equation dependent upon $x_j$ (e.g., the equations corresponding to the nonzero values in the jth column of the Jacobian). However, this method may degrade the sparsity of the Jacobian because the expression for $x_j$ may contain the values of many other unknown variables. For example, substituting the expression for $x_j$ into a residual equation $R_k$ may introduce a dependence of $R_k$ on the value of some other variable (e.g., $x_m$). This may introduce additional nonzero values into the Jacobian matrix. Degrading the sparsity of the matrix may increase the overall computational cost and, consequently, this approach may not be useful.

Alternatively, if the substitution is performed on an explicit variable in a Jacobian arising from the AIM strategy, the sparsity of the matrix may be unaffected. For example, a variable may be treated explicitly in the flow related terms and, consequently, the values in the jth column of J may be zero. An exception may be values in the block diagonal corresponding to the other equations in the same element, which may already be nonzero. Therefore, in this case, the substitution may add no additional nonzero values to the Jacobian matrix. FIGS. 3A-3B show an example structures of Jacobian matrices for systems of equations with two elements and two residuals per element. FIG. 3A shows an example structure of a Jacobian matrix using a fully implicit methodology. FIG. 3B shows an example structure of a Jacobian matrix that uses an adaptive implicit method with the "Residual 2" in both elements treated explicitly. FIG. 3C shows an example structure of a Jacobian matrix that uses an adaptive implicit method in conjunction with variable substitution. Due to the variable substitution, the "Residual 2" equation has been eliminated and the "Residual 1" equation has been transformed into "Residual 1*" by substitution of "Residual 2" into "Residual 1."

In practice, the AIM strategy with variable substitution may be complex to implement as compared to the standard AIM strategy due to the complex nature of the elements used to describe hydraulic fracturing and flow in the reservoir and wellbore. Furthermore, it may not be possible to solve each explicitly assigned equation analytically to a closed-form solution in terms of the other system variables. Therefore, direct substitution may not be possible. Alternatively, the AIM strategy may be used with direct substitution and numerical differentiation to estimate the values of the Jacobian. This method may follow the same approach as described with variable substitution, but may avoid the algebraic strategy described in of Equations (6) and (7).

In the previously described variable substitution method, the nonzero values in the Jacobian Matrix $J_{ij}$ may be calculated using analytical derivatives of the residual equations. In standard reservoir simulations (e.g., simulations that do not couple reservoir simulations with hydraulic fracturing simulations) these analytical derivatives may be lengthy and complex to manipulate. As additional physics are introduced to the system (e.g., by incorporating hydraulic fracturing simulation and wellbore simulation), the complexity of the analytical derivatives may increase. In a combined hydraulic fracturing and reservoir simulation, the system may be solved for mass balance on fluid components in a reservoir along with mass balance on viscosifying water solute components, proppants, and energy in the reservoir and wellbore. The balance equations may be solved for flow through a fracture, including multiphase flow with gravitational buoyancy and non-Newtonian and non-Darcy effects. Evaluating the residual equations for the flow equation may be performed with numerical iteration because it may not be possible to write a closed-form equation that isolates the value of the residual on one side of the equation. For example, due to non-Darcy effect, the equations for flow velocity may include a nonlinear squared velocity term. Additionally, due to non-Newtonian effects, fluid viscosity may be a nonlinear function of flow velocity. Consequently, determining the flow velocity may not be possible with an analytical solution, but may be determined using a numerical solution. Equations for proppant settling velocity in a non-Newtonian fluid may also be determined using a numerical solution. Though analytically evaluating these lengthy derivatives may be possible, determining the residual values may require the use of implicit differentiation, which, in turn, may require a numerical solution.

An alternative to analytical differentiation may be the use of a direct numerical approximation of the derivative values in the Jacobian. Using direct numerical approximation of the derivatives may be less accurate and use more computational effort to calculate the values in the Jacobian. However, careful implementation of the method may mitigate problems from machine precision roundoff errors and numerical approximation errors. Direct numerical approximation may increase the flexibility of the simulation and permit new physics or new equations (e.g., components) to be added to the system with minimal effort. Using numerical differentiation, the derivative values in the Jacobian may be approximated with a finite difference approximation:

$$\frac{\partial R_i}{\partial x_j} \approx \frac{R_i(x_j + \Delta x) - R_i(x_j)}{\Delta x}. \tag{8}$$

Using numerical differentiation, the residual may be recalculated using an updated value of $x_j$ evaluated at $x_j+\Delta x$ and the derivative in the Jacobian may be calculated using Equation 8. This procedure may avoid the use of analytical derivation to determine the derivatives.

The variable, $x_j$ may be perturbed by an appropriate amount. There may be a tradeoff between the approximation and the roundoff error. Approximation error may occur because the underlying equations $R_i$ are nonlinear and the finite difference derivative may be a linear approximation. Using smaller values of $\Delta x$ may result in a smaller approximation error. Roundoff error may occur because each double precision floating point variable may be stored by the computer with sixteen digits of precision. Perturbing $x_j$ by an excessively small amount may cause $R_i$ to change near the sixteenth digit of precision such that the calculated difference between the two residual values may have few digits of precision.

The numerical calculation of the derivatives may be performed using any method that is designed to maximize accuracy by balancing roundoff error and numerical precision error. For example, the residual equations may be rescaled such that they have the same units as the corresponding independent variable. In an example, the total molar balance residual $R_m$ may have units of moles per second (moles/s). It may be rescaled to have units of pressure due to reliance on a corresponding independent pressure variable. Rescaling may be accomplished by dividing by the derivative of the accumulation term with respect to the primary variable of the equation (e.g., pressure in the case of the total molar balance equation). The accumulation terms may refer to the calculation of the amount of conserved quantities (e.g., mass or energy) in an element. For example, in reservoir simulation fluid density in an element may directly affect the fluid quantity of the element. The non-accumulation terms (e.g., flow terms) may affect calculations of quantities flowing in or out of the element. The equations may then be made dimensionless by dividing by the characteristic value of the independent variable (e.g., pressure). For example, a characteristic value of pressure may be around 10 megapascals (MPa), a characteristic value of temperature may be 300° Kelvin (K), and a characteristic value of a mole fraction may be 1.0. The rescaled total molar balance equation may be:

$$\overline{R_M} = \frac{R_M \Delta t}{V_p \overline{\rho}_M c_t} \frac{1}{\overline{P}}, \tag{9}$$

where $\Delta t$ is the time step duration, $V_P$ is the pore volume of the element, $c_t$ is the total pore volume compressibility of the element, $\overline{P}$ is a characteristic pressure value (e.g., 10 MPa), and $\overline{\rho}_M$ is the total molar density of fluid mixture in the element. The values in Equation 9 may be taken from the previous time step, with the exception of $\Delta t$ and $R_M$, to maintain consistency within a time step.

The finite difference approximation may only be accepted if the change in the rescaled residual equation is within a certain range, such as between $1\times10^{-3}$ and $1\times10^{-13}$. If the scaled change is too large, then the process may be repeated with a smaller value of $\Delta x$. If the scaled change is too small, the process may be repeated with a larger value of $\Delta x$. Maintaining the scaled residual change within the above range may reduce the risk of roundoff and approximation error.

Equation (9) may scale by the magnitude of the accumulation term. The accumulation term may be the dominant term in the residual. However, in a system with a large time step and elements with high transmissivity and small pore volume elements, flow terms may become substantially larger than the accumulation term. This method of flow-term scaling may help to avoid problems caused by precision error when small pressure changes drive large amounts of flow. The flow term scaling factor may be used when the flow term scaling factor is larger than the accumulation scaling factor. The system may also be bound by preventing phase change to occur in response to the change $\Delta x$. For example, when a pressure or molar composition is changed such that the hydrocarbon mixture changes from one phase to two phases, the derivative may be discontinuous. If a discontinuity occurs, the change $\Delta x$ may be discarded and repeated with a step in the opposite direction (e.g., $-\Delta x$). The system may additionally be bound by natural constraints imposed on select variables. For example, a mole fraction may be required to be between zero and one. Therefore, if a mole fraction is equal to zero, then the step $\Delta x$ may be positive. If a mole fraction is equal to one, then the step $\Delta x$ may be negative.

A computer-implemented method for numerically calculating the derivatives (e.g., for every implicit variable $x_j$ in element $E_k$) may include adding a small number $\Delta x$ to the variable (e.g., implicit variable). A check may be run to determine if the physical constraints of the system are violated (e.g., mole fraction greater than one). If the physical constraints are violated $x_j$ may be reset and the time step $\Delta x$ may be subtracted rather than added. The secondary variables (e.g., secondary element properties) in $E_k$ that are affected by variable $x_j$ may be updated. If a phase change occurs in the element, the $\Delta x$ value may be altered and the above described process repeated. The explicit equations in element $E_k$ may be solved for the corresponding explicit variables. The secondary variables in element $E_k$ may then be updated. If a phase change has occurred in the element, the $\Delta x$ value may be altered and the above described process repeated. The derivative for each element $E_m$ that contains an implicit equation affected by variable $x_j$ may be calculated by: (i) solving the explicit equations in these elements and updating their secondary variables; (ii) calculating the residuals of the implicit equations; (iii) nondimensionalizing the implicit equations; (iv) calculating the nonzero Jacobian value using Equation 8 if the nondimensionalized change in each implicit residual is within a usable range; and (v) reverting the variables of each element $E_m$. If the nondimensionalized change in each residual is not within a usable range, the time step the $\Delta x$ may be altered. The variables of element $E_k$ may then be reverted. If the nonzero derivative values associated with variable $x_j$ have been calculated (e.g., corresponding to all values in the column), the method may be halted. If nonzero derivative values remain that need a smaller or a larger time step, the iteration may be repeated. If nonzero derivative values remain that need both a smaller and a larger time step, the iteration may be repeated twice.

Calculation of the nonzero values in the Jacobian may be computationally expensive. Therefore, it may be beneficial to calculate the values as infrequently as possible. The conventional AIM method described herein, may begin by calculating the nonzero values in the full Jacobian matrix, including the values associated with explicit rows and columns. In some cases, the nonzero values associated with the explicit variables and/or residuals may outnumber the nonzero values associated with the implicit variables and/or residuals. The AIM method using variable substitution may bypass directly calculating the derivative of the explicit equations and/or explicit variables. For example, the update in Equation (5) may use a single derivative value and direct application of the Newton method to Equation (4) may involve calculation of four derivative values for a 2×2 matrix. Using the substitution method with numerical derivatives to estimate the values in the Jacobian matrix may increase the computational efficiency of the simulation by reducing the number of nonzero values that must be calculated when assembling the Jacobian. Rather than assembling the full Jacobian and manipulating the matrix to reduce the size of the coupled system to be solved, the substitution method directly assembles the reduced system involving only the implicit equations and/or variables.

Figure 4:
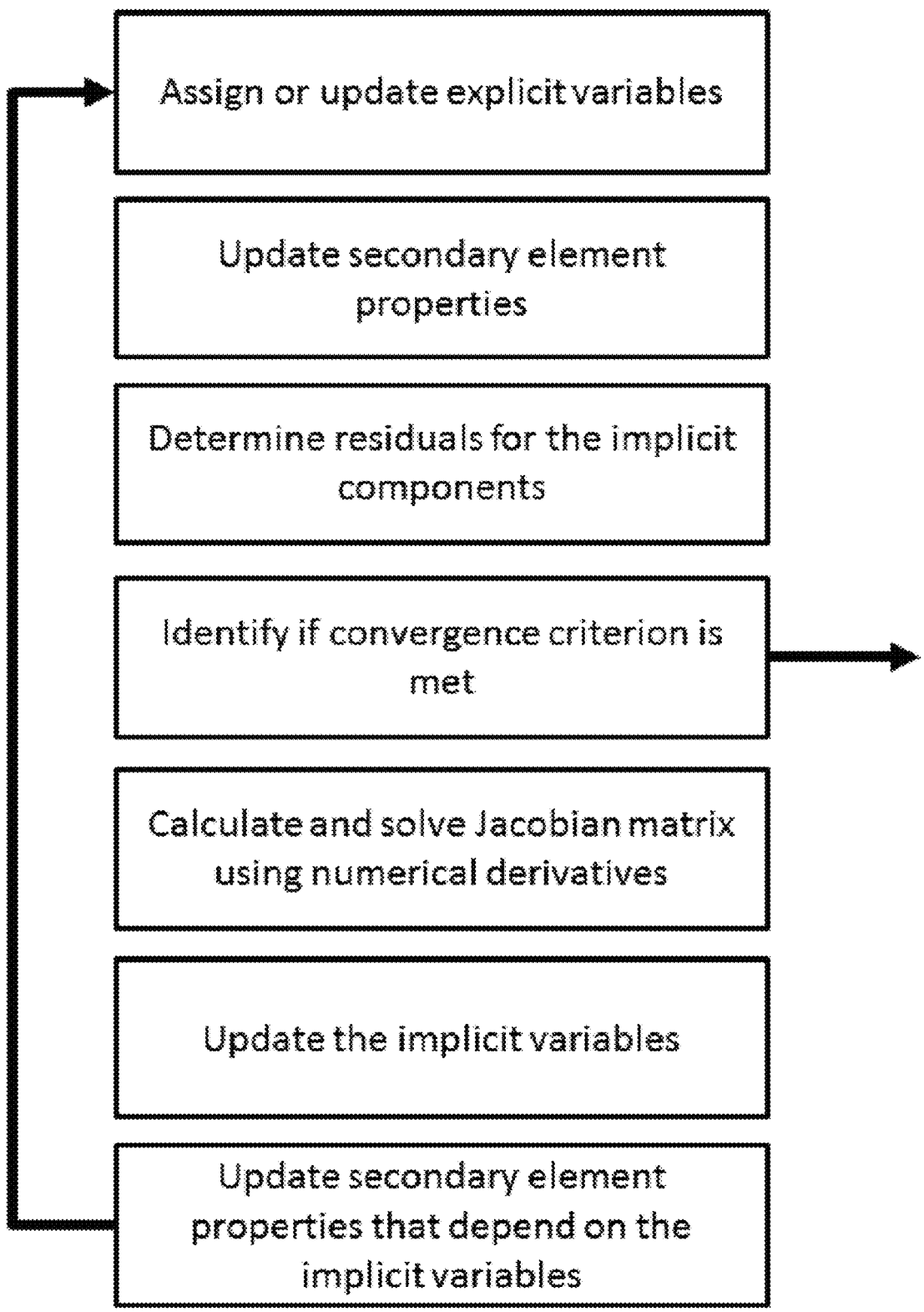
FIG. 4 shows an example process flow diagram for hydraulic fracture and reservoir simulation.

Using the substitution method with numerical differentiation may reduce or eliminate analytically solving the explicit equations and analytically substituting variables. Substitution may be accomplished within the numerical differentiation. Prior to each residual calculation, the explicit equations may be solved for their corresponding unknown and the unknown values may be used directly in the residual calculation. FIG. 4 shows an example process flow diagram for hydraulic fracture and reservoir simulation implementing AIM with variable substitution and numerical differentiation. The explicit equations may be solved for their corresponding unknowns using the current iterated guesses for the unknown variables. The secondary element properties (e.g., density, viscosity, etc.) may be updated for the elements that contain at least one explicit equation. The residuals may be calculated for the implicit unknowns. The system may be checked against a convergence criterion. For example, if the residual values are rescaled according to a procedure such as is shown in Equation (9), and the absolute value is less than a certain tolerance, the values can be considered to be converged. If the system converges (e.g., all residual equations or components have reached the convergence tolerance), the method may be halted. If the system does not meet the convergence criterion, the Jacobian matrix may be calculated. To calculate the Jacobian, for each column j, a small value $\Delta x$ may be added to the unknown and the secondary element properties for the variables in the element may be calculated. The flow terms may then be recalculated. The explicit variables in each element that has a nonzero value in the jth column may be recalculated by solving the corresponding explicit equations. The element's residuals corresponding to the implicit equations may be calculated along with the corresponding derivatives using Equation (8). The element variables that were perturbed in the calculation of the derivatives may then be reset as described elsewhere herein. Once the Jacobian matrix is calculated, the matrix may be solved for the updated vector for the implicit variables dx using Equation (2) followed by updating the implicit variables. The secondary element properties that depend on the implicit variables may be solved using the implicit variables. The explicit variables may then be updated and the iterative process repeated until the convergence criterion is reached.

Using AIM with variable substitution and numerical differentiation may involve fewer residual and secondary variable calculations than AIM methods using analytical derivatives. The residual and secondary variable calculations may scale linearly with the number of elements and may be readily parallelized to multiple computer processors to increase the efficiency of the simulation. Solving the Jacobian may scale poorly with system size and may be difficult to parallelize. The cost of solving the Jacobian may be reduced by the use of the AIM method relative to a fully implicit method and, thus, the overall method may be more efficient than a fully implicit method. Additionally, the computational efficiency may be increased using system optimizations. For example, the method may recalculate only the secondary variables that depend on the perturbed variables rather than recalculating all of the secondary variables. This may be useful for systems with a variety of different physics. For example, it may be unnecessary to recalculate fluid properties in response to a perturbation in proppant volume fraction because proppant volume fraction may not affect the fluid properties. Additionally, the method may reuse derivative values associated with rows and column of the matrix that have converged, which may reduce the total number of derivative values recalculate in later iterations. Another efficiency increase may be found with the boundary element variables used to calculate stress changes due to fracture aperture changes. The derivative of the effective normal stress with respect to aperture of another element may be a constant number that does not change during the simulation. Therefore, these derivatives may be calculated once and reused instead of being recalculated.

The systems and methods described herein may implement a simulator that contains four types of mass and energy balance equation: multiphase fluid flow (e.g., black oil or compositional), water solutes that may impart non-Newtonian flow characteristics on the water phase, proppant transport, and thermal energy. The balance equations may be solved using three different types of elements: fracture elements, wellbore elements, and matrix elements. Wellbore elements may represent sections of a wellbore (e.g., pipe that is cemented into the ground or an openhole section comprising a cylindrical well that has been bored through rock). Matrix elements may represent volumes of rock that contain fluid in the porosity of the rock. Fracture elements may represent sections of cracks formed in the rock that contain fluid and proppant. Each element may comprise different sets of governing equations. Some of the governing equations may overlap between the elements. In each of the elements, each of the four types of balance equations may be assigned as either implicit or explicit. Additionally, the system may include momentum balance equations (e.g., components) in the wellbore elements, poroelastic stress response equations (e.g., components) in the matrix elements, and mechanical stress interaction equations in the fracture elements that may be treated as fully implicit, partially implicit, or explicit. In an example, these equations may be treated as fully implicit.

The equations in the explicit update of a particular element may affect each other. In an example, explicit updates within an element may involve simultaneous solution of all of the equations in the element. In another example, the equations may be structured such that the equations may be solved sequentially. The solution order may be dependent up on the physics of the system and may be any order that allows for the system to converge. An example solution sequence is, (i) the fluid component molar balance, (ii) water solute mass balance, (iii) proppant mass balance, (iv) thermal balance, and (v) the pressure equation for total molar balance. In order to reach a solution with the sequential method, the solution to an equation may be dependent upon the solution of the preceding equations, but may not be dependent upon the solutions to subsequent equations. In an example, pressure is treated explicitly. The preceding equations may depend on the pressure variable due to the effect on porosity and phase density. However, because pressure is changing very slightly in explicit pressure components, the error may be second-order and negligible.

The compositional model may be implemented by treating the mole fractions as primary or secondary variables. In an example, the mole fractions are treated as primary variables. There may be one or more total molar balance equation associated with pressure. There may be $n_c-1$ molar balance equations associated with the specific molar fractions, where $n_c$ is the total number of fluid components being tracked by the model. In this context, a fluid component is a particular type of molecule being tracked, such as methane or carbon dioxide. Variable switching may be used to ensure that the one molar balance equation that is not explicitly solved is not the molar balance with the highest molar fraction. All $n_c$ of these equations, including the pressure components, may be treated implicitly or explicitly. The component balance equation may be treated implicitly or explicitly. In an example, the component balance equation is treated explicitly.

In reservoir simulation, pressure may not be treated explicitly because the time set restrictions on stability of the pressure equation may be limited. However, in simulations with hydraulic fractures embedded in a matrix, the time steps may be on the order of seconds (e.g., due to the rapidly changing parameters in the fracture). Using small time steps may enable the pressure equations (e.g., components) to be treated fully explicitly in the matrix elements and still maintain numerical stability. The number of matrix elements may outnumber the fracture elements in the simulation and so treating many, or all, of the matrix elements explicitly may increase computational efficiency. If a matrix element is handled fully explicitly, the matrix components (e.g., equations that make up the matrix element) may be removed from the coupled nonlinear solution of equations in the implicit update. When calculating residual equations in adjacent elements that have implicit pressure, the flow terms from the explicit pressure element may be calculated using the pressure from the previous time step. The flow terms of the explicit pressure elements may be calculated after the nonlinear solution is completed using the explicit pressure values from adjacent explicit pressure elements and using the implicit pressure values from adjacent implicit pressure elements previously calculated. Once the flow terms are known, the explicit equations may be solved in a specified order.

The effective flowing water properties of the system may require different treatment because they may depend non-linearly on variables that are mixed between implicit and explicit. Using an AIM strategy, effective flowing properties (e.g., density and/or viscosity) may be calculated using the parameters from the previous time step and/or the parameters from a new time step. Calculating the effective flow properties using parameters from the previous or current time step may be difficult if variables are a mixture of implicit and explicit. The water properties (e.g., density, viscosity, and saturation) may depend on water mole fraction, water solute mass fraction, temperature, and pressure. These properties may be mixed between implicit and explicit. For example, the water properties may include implicit water mole fraction and explicit temperature and composition. In this case, a separate 'effective' water phase may be calculated that may be evaluated at mixed molar fraction, water solute fraction, pressure and temperature. This effective water phase may be used in the flow calculations. These effective phase calculations may allow for implicit thermal mixed with explicit composition equations and/or variables. For flow terms in explicit composition elements, values such as density and viscosity may be used directly from the previous time step and the dependence on the implicit temperature variable may be ignored. This method may be used to simulate flow of the non-water phase. For example, if an element has an explicit composition, then the phase properties may be used from the previous time step regardless of the explicit and/or implicit status of the temperature component. However, for the water phase there may be significant nonlinearity arising from the viscosifying and non-Newtonian water solutes and the effective flowing properties may be calculated from a mixture of implicitly and explicitly treated variables.

Assignment of equations and variables as implicit and/or explicit may be made for each time step and/or equation and variable assignments may be constant across multiple time steps. Implicit and/or explicit assignments for equations and variables for pressure, composition, water solute fraction, proppant fraction, and temperature may be made for each time step. Equation and/or variable assignment may be performed using the Courant-Friedrichs-Lewy (CFL) number method by calculating a sum of the absolute value of the flow terms and dividing that calculated value by the total pore volume of the element (e.g., matrix or fracture element). If the ratio is greater than one, the variable type may be assigned to be implicit. If the ratio is less than one, the variable type may be assigned to be explicit. Alternatively, to be conservative, a ratio cutoff less than one may be used.

The explicit updates may fail if they result in negative quantities. For example, if a conserved species (e.g., component, water solute, or proppant type disappears during a time step, inaccuracy may occur in the explicit update. Therefore, if an explicit update results in a negative amount of a species, then the time step may be discarded. To avoid this problem, the equations and/or variables that are at risk of disappearing may be handled implicitly. In this case, when calculating the CFL number, the sum of the absolute value of the element may be divided by the amount of conserved species. For example, for proppant, the total proppant flow volume of each proppant type may be divided by the volume of that type in the element. For water solutes, the mass of flowing solute may be divided by the total amount of solute present in the element. For components, the flowing moles of each type may be divided by the moles of the type present in the element. For composition, the total flowing volume in and/or out of the element may be divided by the pore volume of the phase that has the smallest nonzero saturation. Another method for assigning equations and/or variables that may be at risk of disappearing if treated explicitly may be to estimate the derivative of each volumetric flow term and multiply it by 0.1 MPa. That value may then be divided by the pore volume of the phase with the smallest saturation. For example, composition may be treated implicitly if this ratio is greater than one. Alternatively, to be conservative, a value of less than one may be used. This type of assignment method may select for elements that may be emptied of an entire phase by a small change is pressure.

For example, matrix elements may be considered for explicit treatment of pressure. The CFL number method ay be used to assign the pressure variable as either implicit or explicit for each phase. The ratio may be determined by:

$$\frac{kk_{rp}}{\mu_p c_t \phi} \Delta t \frac{1}{\Delta L^2}, \quad (10)$$

where $\Delta L$ is the smallest dimension of either the height, width, or length of the element, $kk_{rp}$ is the permeability times the relative permeability of the phase, $\phi$ is the element porosity, and $\mu_p$ is the viscosity of the phase. If the ratio in Equation (10) exceeds one for any of the phases, the element may be assigned implicitly.

The time step duration may strongly affect the explicit and/or the implicit assignments. The time step may be varied such that a select percentage of variables are assigned as explicit or implicit. Alternatively, or in addition to, the time step duration may be adaptively varied by limiting the observed change in the independent variables in each time step. Thus, the percentage of implicit or explicit equations may vary widely between time steps.

Methods and systems of the present disclosure can be implemented by way of one or more algorithms. The method can be implemented by way of software upon execution by one or more processors. The method can, for example, direct a computer memory to store and update explicit and implicit variables, store and update secondary element properties, and/or store and update components of the matrix elements, fracture elements, and wellbore elements. The method may solve the matrix components, fracture components, and wellbore components. The method may solve the matrix elements, fracture elements, and wellbore elements to simulate hydraulic fracture and fluid flow in the wellbore and reservoir. The method may generate plots that represent the simulation results and may display the plots on an electronic display.

EXAMPLE

An integrated three-dimensional reservoir, wellbore, and hydraulic fracturing simulator is used to simulate a single-stage fracture job from a vertical well, followed by production. The system includes injection of a pad followed by water with a 60 mesh proppant. This is followed by a lower rate injection of water gelled with guar and 20 mesh proppant. The fracturing treatment is shown to generate a large, well-propped fracture. The fracture propagates below the water-hydrocarbon contact, resulting in significant watercut during production. The system includes molar balance equations on fluid components, water solute mass balance equations, proppant mass balance equations, thermal balance, momentum balance in the wellbore, and mechanical interaction equations between the fracture elements.

The simulation involves injection to create a single hydraulic fracture. The fracture height is limited by stress layering. Proppant transports through the fracture and gravitational settling settles out and screes out of the fracture tip. Water solutes are injected that impact non-Newtonian rheological characteristics and fluid is produced from the fracture and the surrounding formation. Multiphase flow occurs in the fracture during production, which involves gravitational segregation.

Figure 5:
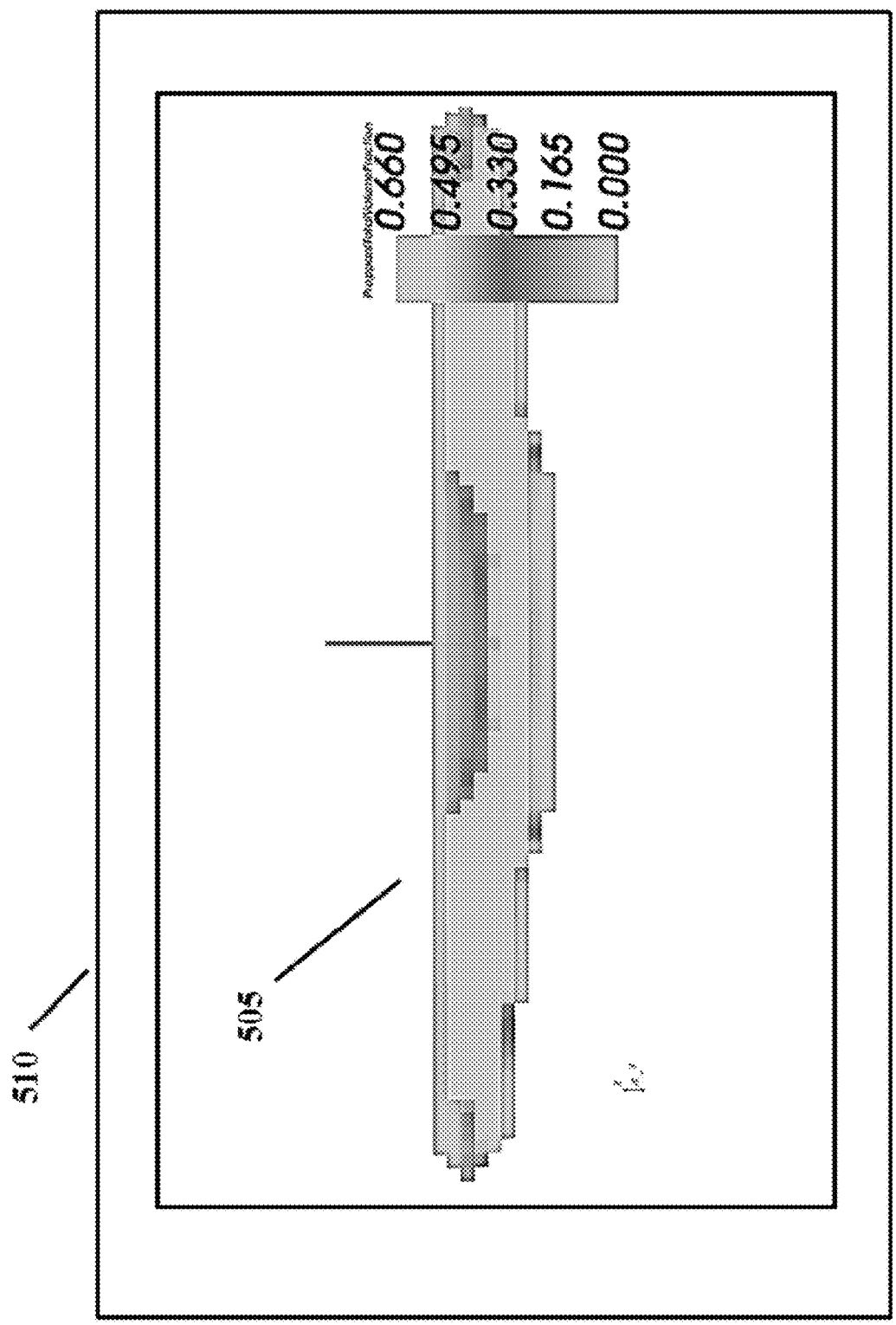
FIG. 5 shows an example simulation of the distribution of proppant volume fraction in the fracture at shut-in displayed on a graphical user interface.
Figure 6:
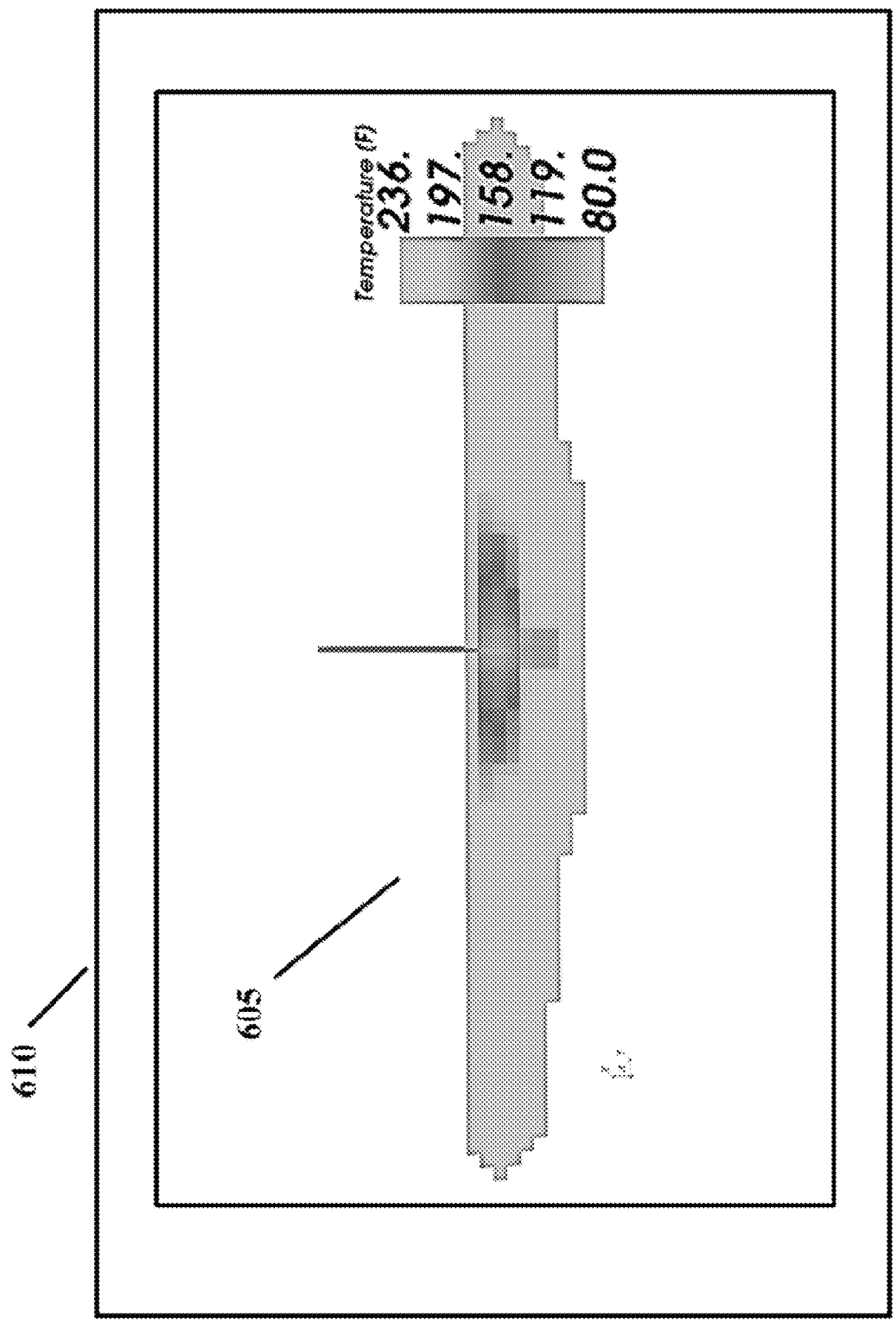
FIG. 6 shows an example simulation of the distribution of temperature in the fracture at shut-in displayed on a graphical user interface.
Figure 7:
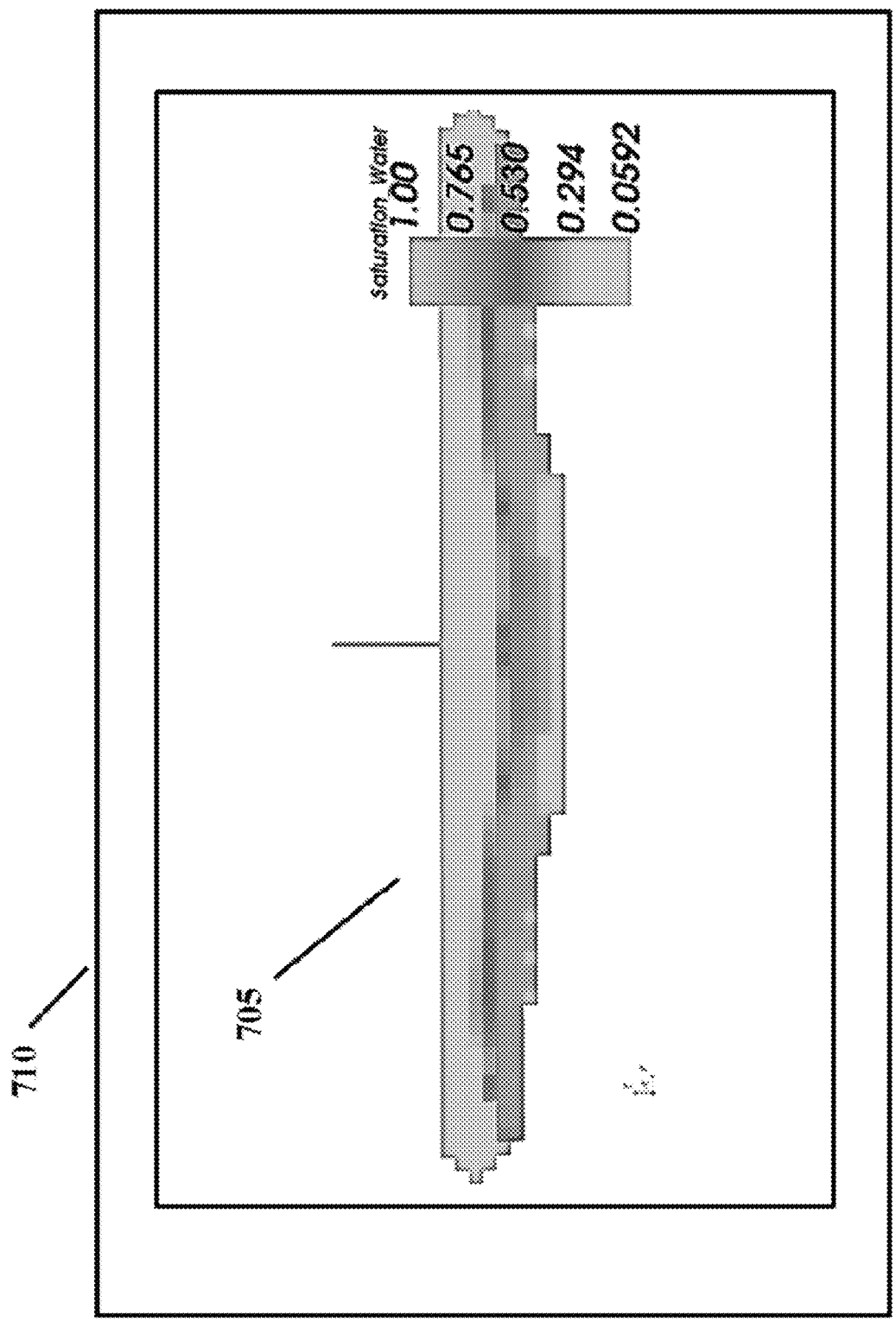
FIG. 7 shows an example simulation of the distribution of water saturation in the fracture after 215 days of production displayed on a graphical user interface.

FIG. 5 shows simulation results of the distribution of proppant volume fraction in the fracture at shut-in, 2.86 hours, at the end of injection 505 displayed on an example graphical user interface 510. At this time, proppant is seen to almost entirely fill the fracture, indicating successful proppant placement. FIG. 6 shows simulation results of the distribution of temperature in the fracture at shut-in 605, 2.86 hours, on an example graphical user interface 610. A substantial region of cooling develops near the wellbore region. As the matrix discretization is fairly course in the vertical direction, some mesh dependency is evident in the temperature distribution. FIG. 7 shows simulation results of the distribution of water saturation in the fracture after 215 days of production 705 displayed on an example graphical user interface 710. The initial water-hydrocarbon contact is located twenty feet below the perforation cluster. A substantial amount of fracture growth and proppant placement occurs below the contact, and so a significant amount of the fracture is filled with water. As a result, the well produces a significant water cut. Above the water-hydrocarbon contact, there is residual water trapped in the fracture, reducing relative permeability to the hydrocarbon phase.

Figure 8:
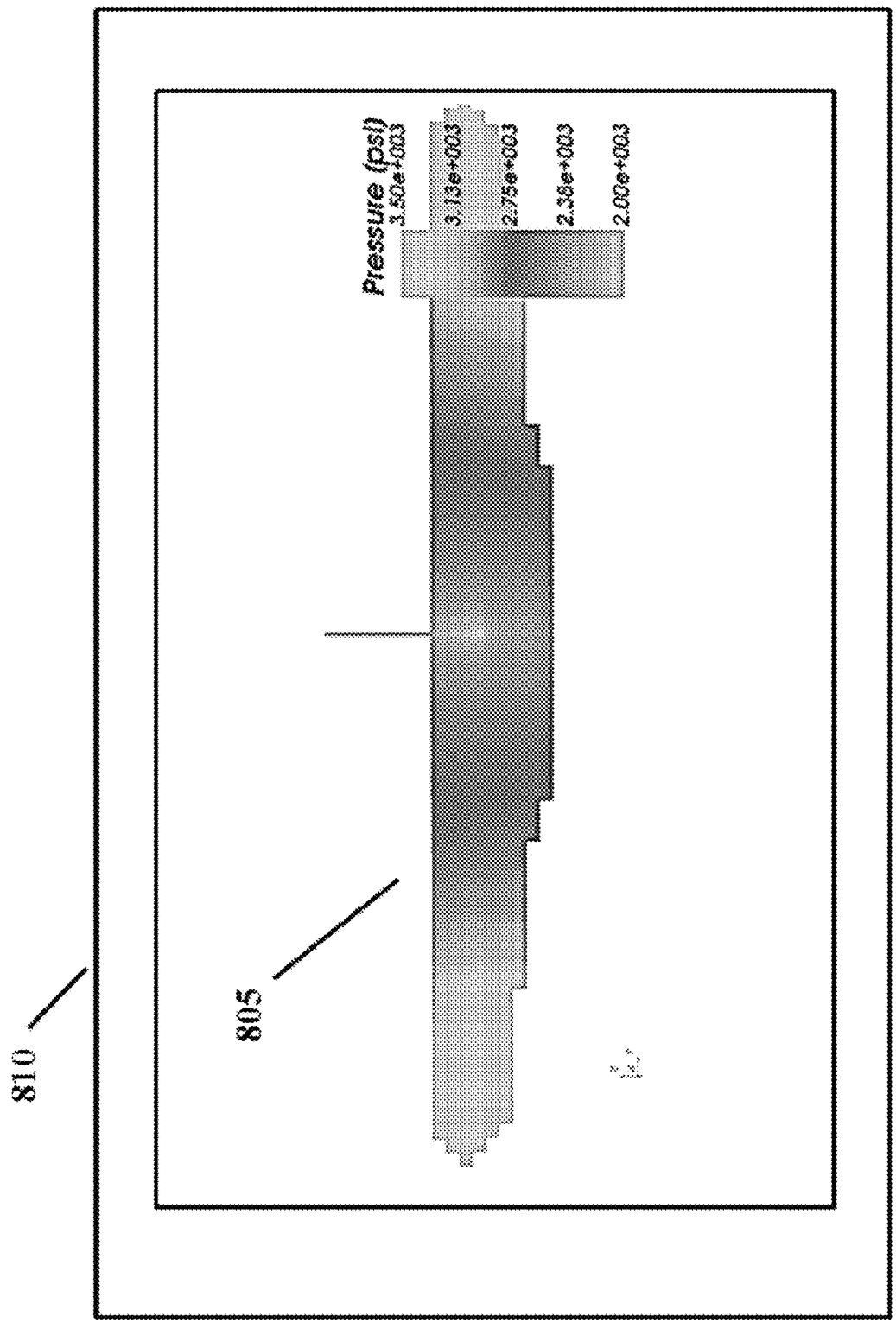
FIG. 8 shows an example simulation of the distribution of pressure in the fracture after 215 days of production displayed on a graphical user interface.
Figure 9:
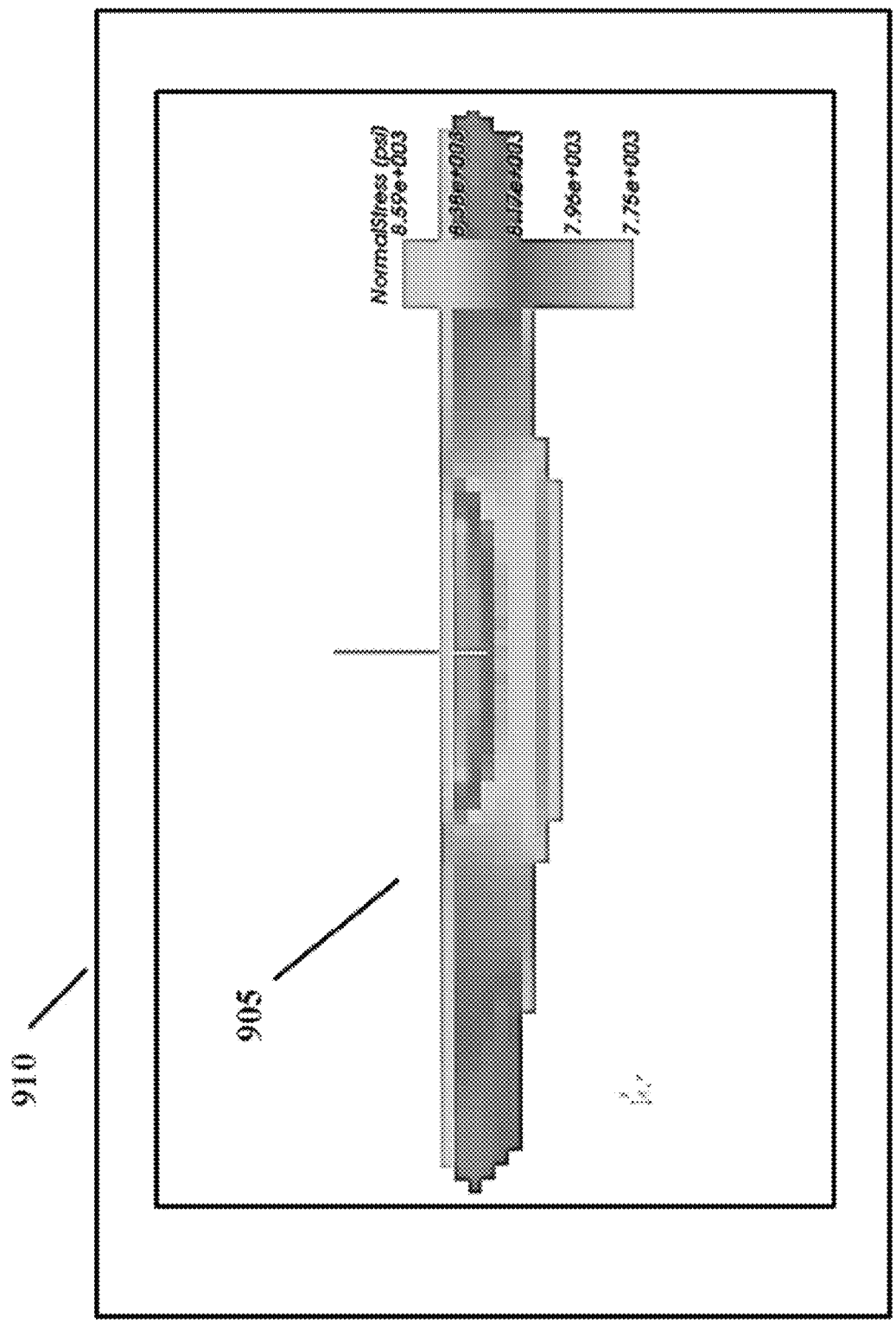
FIG. 9 shows an example simulation of the distribution of normal stress in the fracture after 215 days of production displayed on a graphical user interface.
Figure 10:
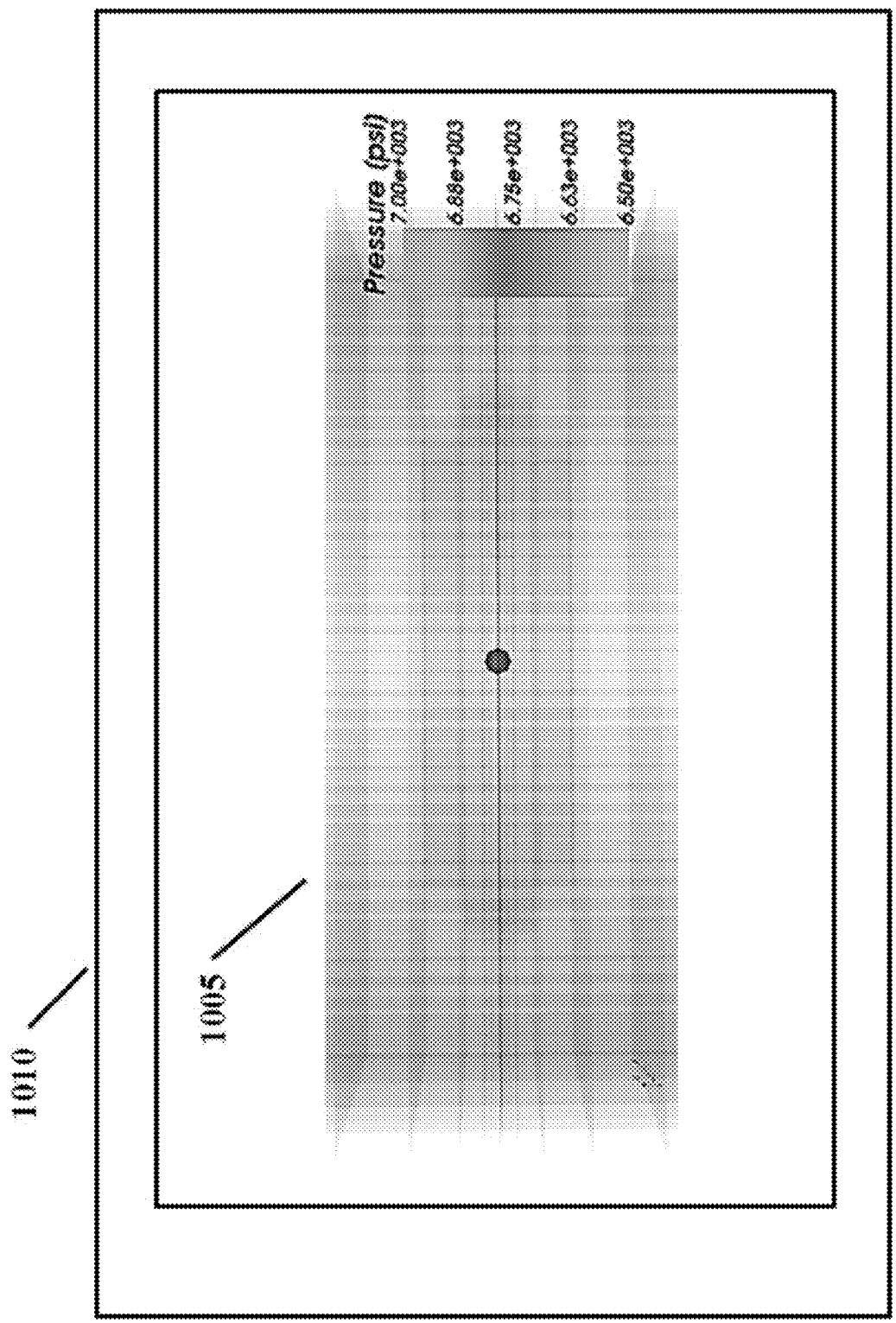
FIG. 10 shows an example simulation of the distribution of fluid pressure in the matrix after 215 days of production displayed on a graphical user interface.
Figure 11:
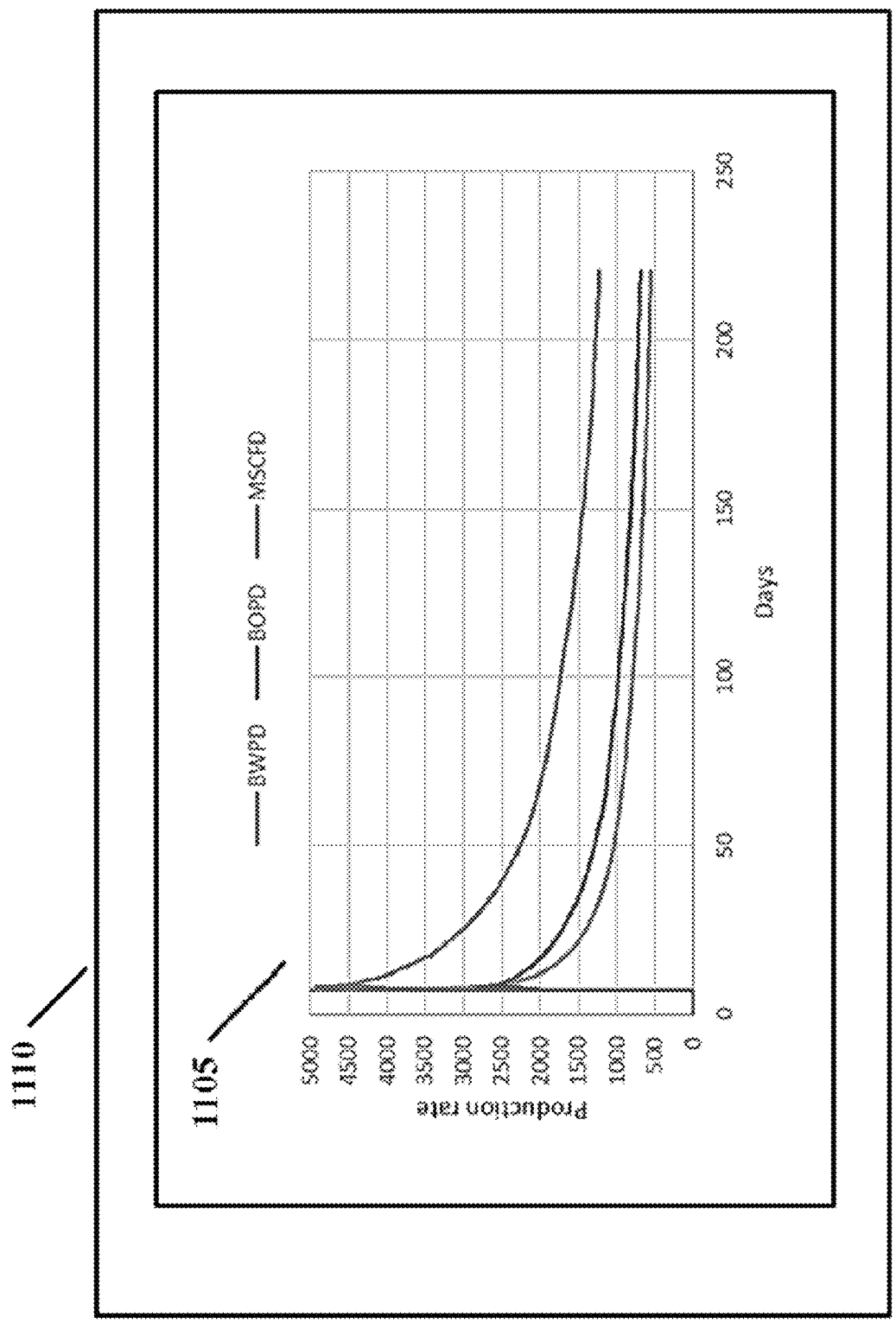
FIG. 11 shows an example simulation of the production rate of water, oil, and gas as a function of time displayed on a graphical user interface.

FIG. 8 shows simulation results of the distribution of pressure in the fracture after 215 days of production 805 displayed on an example graphical user interface 810. There is a pressure gradient across the fracture from the tips to the well, indicating that despite the successful proppant placement, there is pressure drawdown along the fracture. The pressure drawdown occurring in the fracture demonstrates the importance of maximizing fracture conductivity, minimizing non-Darcy effect near the wellbore region, and minimizing fracture damage from fracturing fluid. FIG. 9 shows simulation results of the distribution of normal stress in the fracture after 215 days of production 905 displayed on an example graphical user interface 910. The minimum principal stress at is approximately 8,000 pounds per square inch (psi) at approximately 11,000 feet (ft). In the near wellbore region, fracture normal stress is elevated up to 500 psi above the minimum principal stress because of the stress shadow caused by the propping open of the aperture by the proppant. Near the tips of the fracture, where less proppant is placed, the stress shadow is weaker and the normal stress is near the in-situ minimum principal stress. In the region above the perforation cluster, where little proppant is places, the normal stress is up to 300 psi less than the in-situ minimum principal stress. This may occur because the normal stress in this part of the fracture is reduced by stresses induced by the aperture in the nearby, highly propped parts of the fracture. FIG. 10 shows simulation results of the distribution of fluid pressure in the matrix after 215 days of production 1005 displayed on an example graphical user interface 1010. The pressure distribution is approximately linear, beginning to transition into elliptical. There is a narrow region of large pressure decline immediately surrounding the fracture. There is a much broader region of mild pressure decline in the surrounding matrix. FIG. 11 shows simulation results of the predicted production rate of water, oil, and gas as a function of time 1105 displayed on an example graphical user interface 1110. Rates decline approximately with the square root of time, as expected for linear flow. The water production rate is relatively high because a large percentage of the fracture is placed below the water-hydrocarbon contact.

Cloud-Based Simulation as a Service

As described above, systems and methods of the present disclosure may be implemented to provide cloud-based simulation-as-a-service. The instant and user-friendly simulation services can beneficially help operators shorten the learning curve: identify promising frac designs, rank the importance of key uncertainties, understand physical processes, inspire new ideas, and quantitatively optimize key parameters.

The simulation-as-a-service may be offered using a single 3D simulator that seamlessly couples hydraulic fracturing, wellbore, geomechanical, and reservoir simulation. The simulator may couple simulation of hydraulic fracturing and reservoir simulation including modeling processes that operate on different timescales and capture the life cycle of an unconventional well or pad: hydraulic fracturing, shut-in, closure, production and any subsequent child fracturing or refracturing and simulate the entire life cycle of unconventional wells including fracturing and production in a single simulation run. The single simulator may use a form of the adaptive implicit method (AIM) to solve the model elements (e.g., matrix elements, fracture elements, and wellbore elements) and implement various methods and algorithms as described above.

Figure 12:
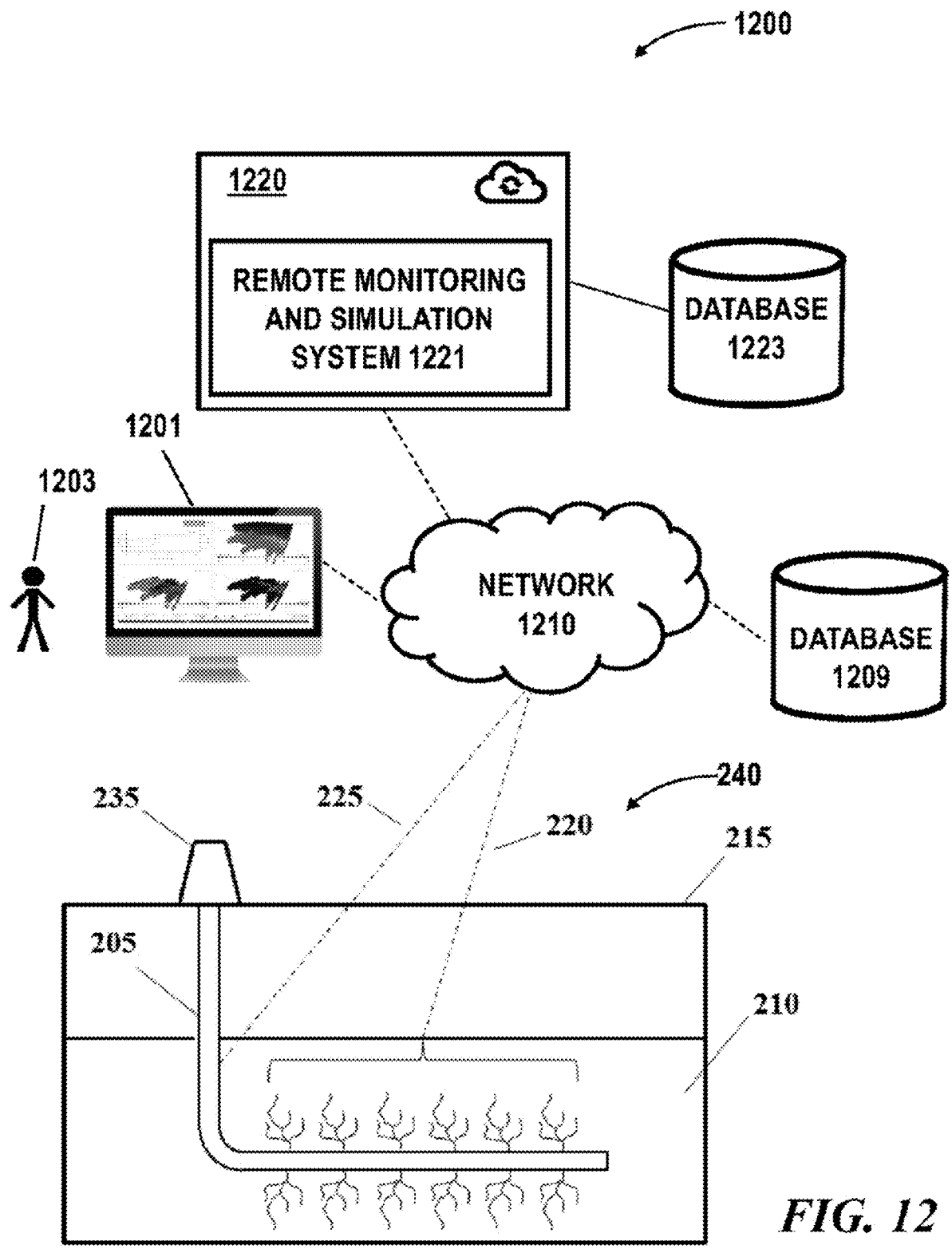
FIG. 12 schematically illustrates an example of a platform for remote monitoring and simulating hydraulic fracturing and reservoir, in accordance with some embodiments of the present disclosure.

FIG. 12 schematically illustrates an example of a platform 1200 for remote monitoring and simulating hydraulic fracturing and reservoir, in accordance with some embodiments of the present disclosure. The platform 1200 may include one or user devices 1201, a remote system (e.g., a cloud) 1220, a remote monitoring and simulating system 1221, and a database 1223, 1209. In some cases, the platform 1200 may comprise one or more sensors deployed at a scene (e.g., well system, treatment wells, observation wells, or other types of wells, etc.). The sensors, wellbore and reservoir can be the same those as described in FIG. 2. Each of the components 1201, 1220, 1221, 1223, 1209 and sensors may be operatively connected to one another via network 1210 or any type of communication links that allows transmission of data from one component to another.

The platform 1200 may implement modeling and simulating hydraulic fracturing and fluid flow in a wellbore and reservoir. The platform may also facilitate collaboration between disciplines and to distill the various perspectives into a coherent model, enable communication between a user and leverage inputs from geology, geomechanics, completions, reservoir and production experts for simulating the entire life cycle of unconventional wells in one model.

The remote monitoring and simulating system 1221 may receive data from the calibration well (e.g., either from a user or via an upload from sensors or data logs), use the data to generate a model of the calibration well, generate equations to represent the matrix elements, fracture elements, and reservoir elements within the model, solve the model, compare the model solution to the production data from the calibration well, receive hydraulic treatment conditions (e.g., from a user of from a memory of the system), solve the calibrated model to generate simulation data, and display the simulation results to a user (e.g., via a display).

In some cases, the remote monitoring and simulating system 1221 may be operatively linked to one or more rigs and/or wellsites, and used to receive data, process data, send control signals. In some case, the remote monitoring and simulating system 1221 may be functionally connected to one or more controllers for actuating mechanisms at the wellsite. For example, the simulation results may be transmitted to an edge computing system close to the wellsites 240 and the edge computing system may then send command signals to the oilfield in response to the simulation data received. The edge computing system may receive commands via a transceiver or may execute commands to the controller. In this manner, operations may be selectively adjusted based on the simulation data generated by the remote monitoring and simulating system 1221. Portions of the operation, such as controlling drilling, weight on bit, pump rates or other parameters, may be optimized based on the simulation information. These adjustments may be made automatically based on computer protocol, and/or manually by an operator. The control process can be a feedback control based on the simulation data and/or the real-time sensor data. For example, the physical parameters for controlling the drill (e.g., location, rate, etc.) may be adjusted based on the sensor signal feedback and/or simulation result.

The remote monitoring and simulating system 1221 may comprise simulation services or applications that run in the cloud or an on-premises environment to remotely monitor and manage the well system and provide simulation results/services to a user 1203. This environment may run in one or more public clouds (e.g., Amazon Web Services (AWS), Azure, etc.), and/or in hybrid cloud configurations where one or more parts of the system run in a private cloud and other parts in one or more public clouds. For instance, in response to a user submitting a simulation, the REST APIs may be used to communicate directly with the cloud simulation services hosted on Microsoft Azure.

The remote monitoring and simulating system 1221 may employ any suitable technologies such as container and/or micro-service for providing the simulation services. For example, the simulation applications can be a containerized application. The remote monitoring and simulating system 1221 may deploy a micro-service based architecture in the software infrastructure such as implementing a simulation application or service in a container. Application containers are what developers are trying to move into production or onto a cluster to meet the needs of the business. The methods and systems can be implemented in application provided by any type of systems (e.g., containerized application, unikernel adapted application, operating-system-level virtualization or machine level virtualization).

The remote monitoring and simulating system 1221 may provide an integrated three-dimensional simulator for reservoir, wellbore, and hydraulic fracturing simulation as described above. The remote monitoring and simulating system 1221 may include a plurality of components such as simulation builder, the visualization tool, and a graphical user interface (GUI) module that permits users to interact with the system.

The simulation builder may be developed and improved via a code refactoring process to improve the performance (e.g., highly responsive) particularly when handling large volume of data. The 3D visualization tool allows the user to decide what to visualize and provides a variety of intuitive options to customize the view. The 3D visualization tool may be designed to be capable of loading and manipulating 3D visualization datasets with improved responsiveness. For example, when performing operations such as matrix slicing, and rotated stretch, an open source 3D graphics library may be used for the actual rendering, whereas the low-level setup of the visualization vertices and triangles is performed by the 3D visualization tool. The remote monitoring and simulating system 1221 may also provide a 3D preview viewer that is a simplified version of the visualization tool used for full simulations. A user 1203 may set up the simulation, visualize results, and keep track of one or more simulations via the GUI provided on the user device 1201 while the simulations are run on the cloud 1220.

In some embodiments, users 1203 may utilize user devices 1201 to interact with the remote monitoring and simulating system 1221 by way of one or more software applications (i.e., client software) running on and/or accessed by the user devices, wherein the user devices and the remote monitoring and simulating system 1221 may form a client-server relationship.

In some embodiments, the client software (i.e., software applications installed on the user devices) may be available either as downloadable applications for various types of computing devices. Alternatively, the client software can be implemented in a combination of one or more programming languages and markup languages for execution by various web browsers. For example, the client software can be executed in web browsers that support JavaScript and HTML rendering, such as Chrome, Mozilla Firefox, Internet Explorer, Safari, and any other compatible web browsers. The various embodiments of client software applications may be compiled for various devices, across multiple platforms, and may be optimized for their respective native platforms.

In some embodiments, the remote monitoring and simulating system 1221 may comprise a user interface (UI) module. In some cases, the user-interface is running inside a self-contained web-browser such that the entire user-interface may be served as a web app accessible through a web browser. Alternatively or additionally, the user interface may be a locally installed user-interface allowing the program to run without a network connection and with minimized lag. In some cases, some functionality of the back-end simulator and/or 3D visualization tool may be incorporated into the UI. For example, a user may perform a compositional simulation, the 2D preview capability may allow the user to simulate a constant compositional expansion from within the UI. The calculation may be performed with the simulator's flash calculation engine. Additionally, the input file read/write functions and validation functions can be directly shared between the UI and simulator, avoiding duplication and eliminating the need to maintain consistency across two separate code bases.

Figure 13:
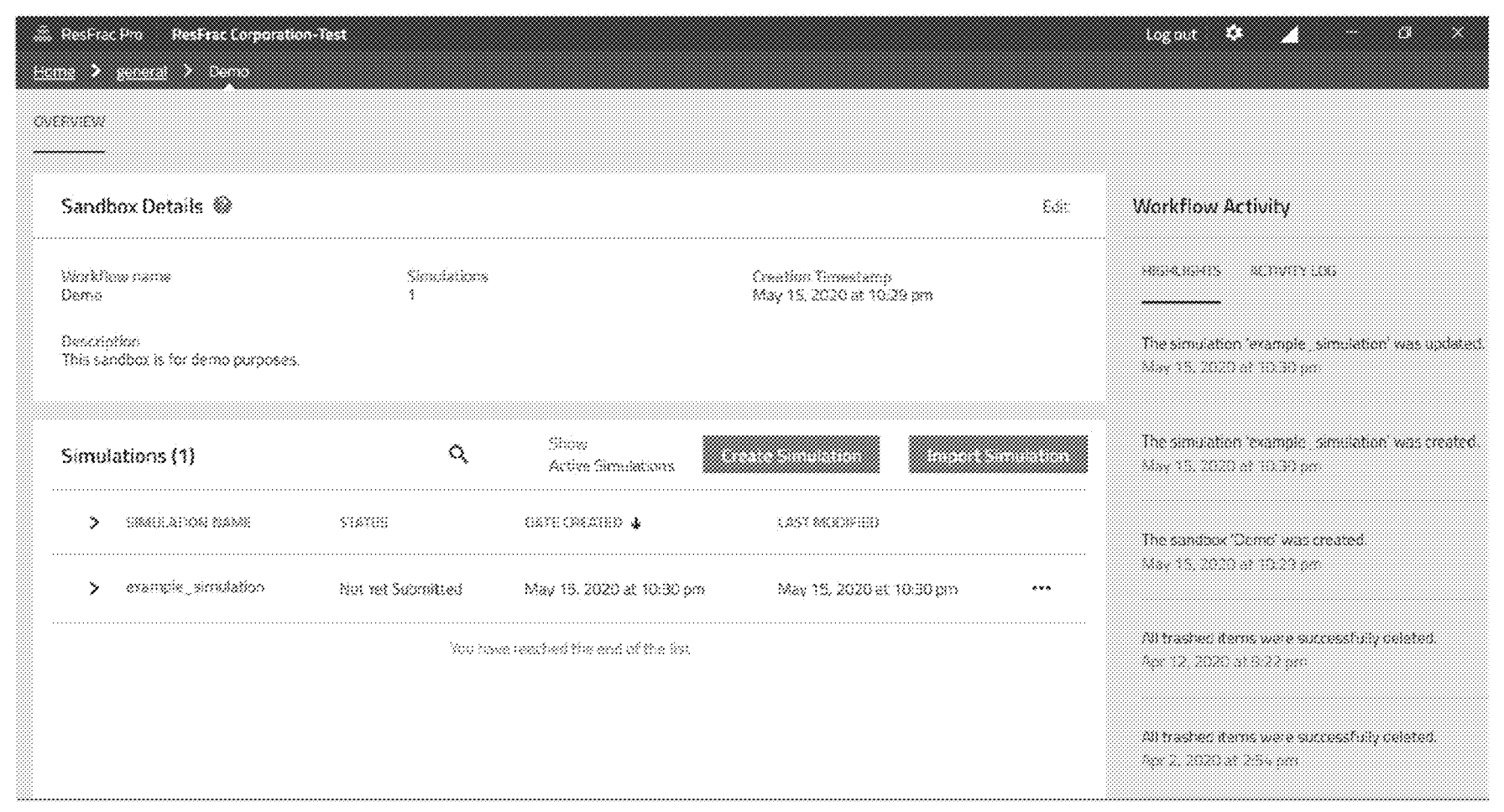

FIG. 13 shows an example of a graphical user interface (GUI) rendered on a display of a user device. The user interface may permit users to set up single or batches of simulations, submit them, and analyze them. For example, a job manager as illustrated in the example allows users to set up and manage simulations. Once a user clicks on a simulation, a variety of options are automatically displayed including, for example, editing in the simulation builder, visualizing results, submitting to run on the cloud server, copying, deleting, importing or exporting, recording notes about each simulation, and various others.

Figure 14:
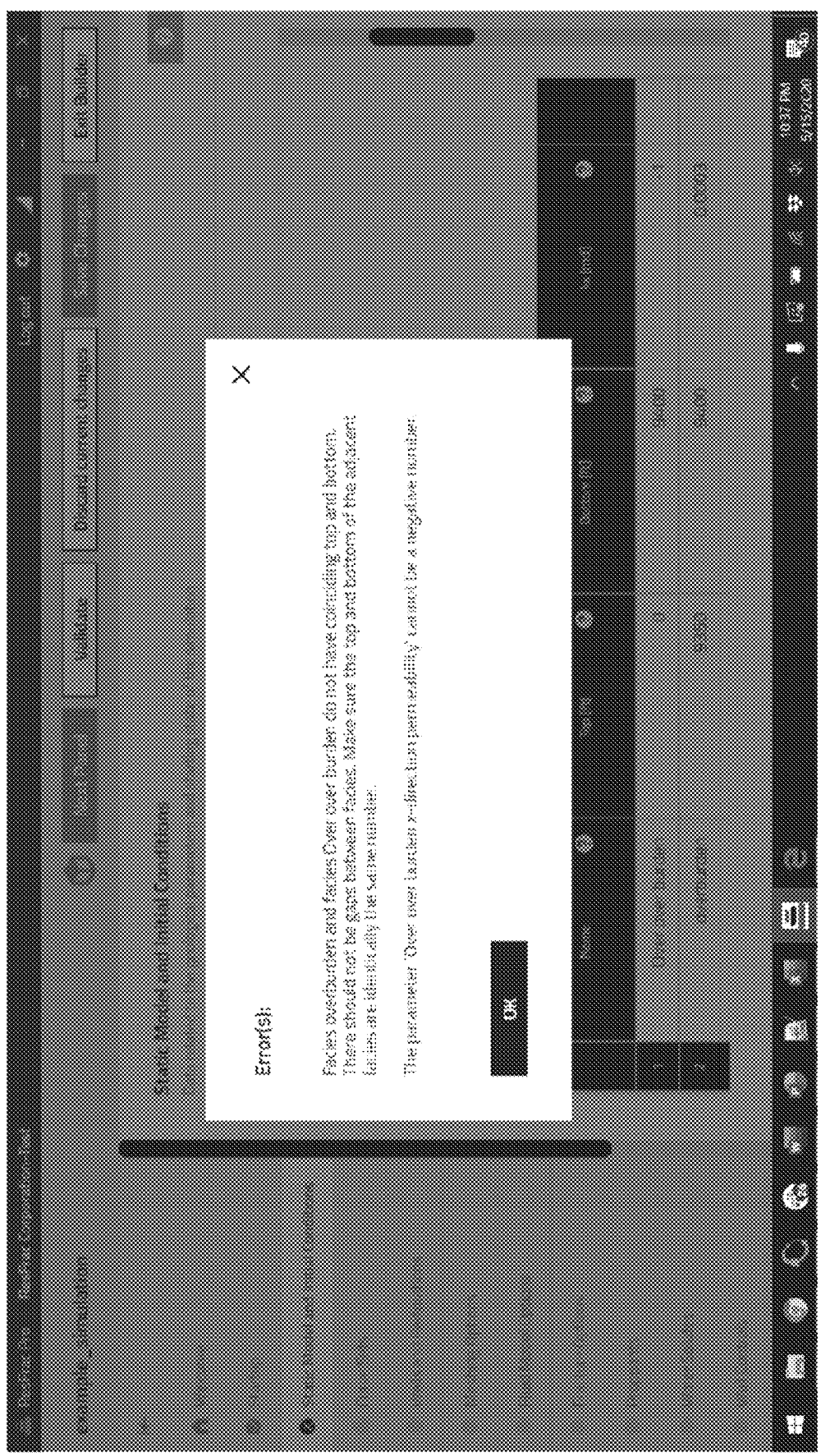
FIG. 14 shows an example of a graphical user interface for setting up a simulation.

FIG. 14 shows an example of a graphical user interface for setting up a simulation. A user may be guided through a series of streamlined settings and functions. In some cases, every user entry is checked with a validation function, which reports errors that to be corrected to run the simulation and warnings that may or may not be wrong and may not need to be corrected to run the simulation.

Figure 15:
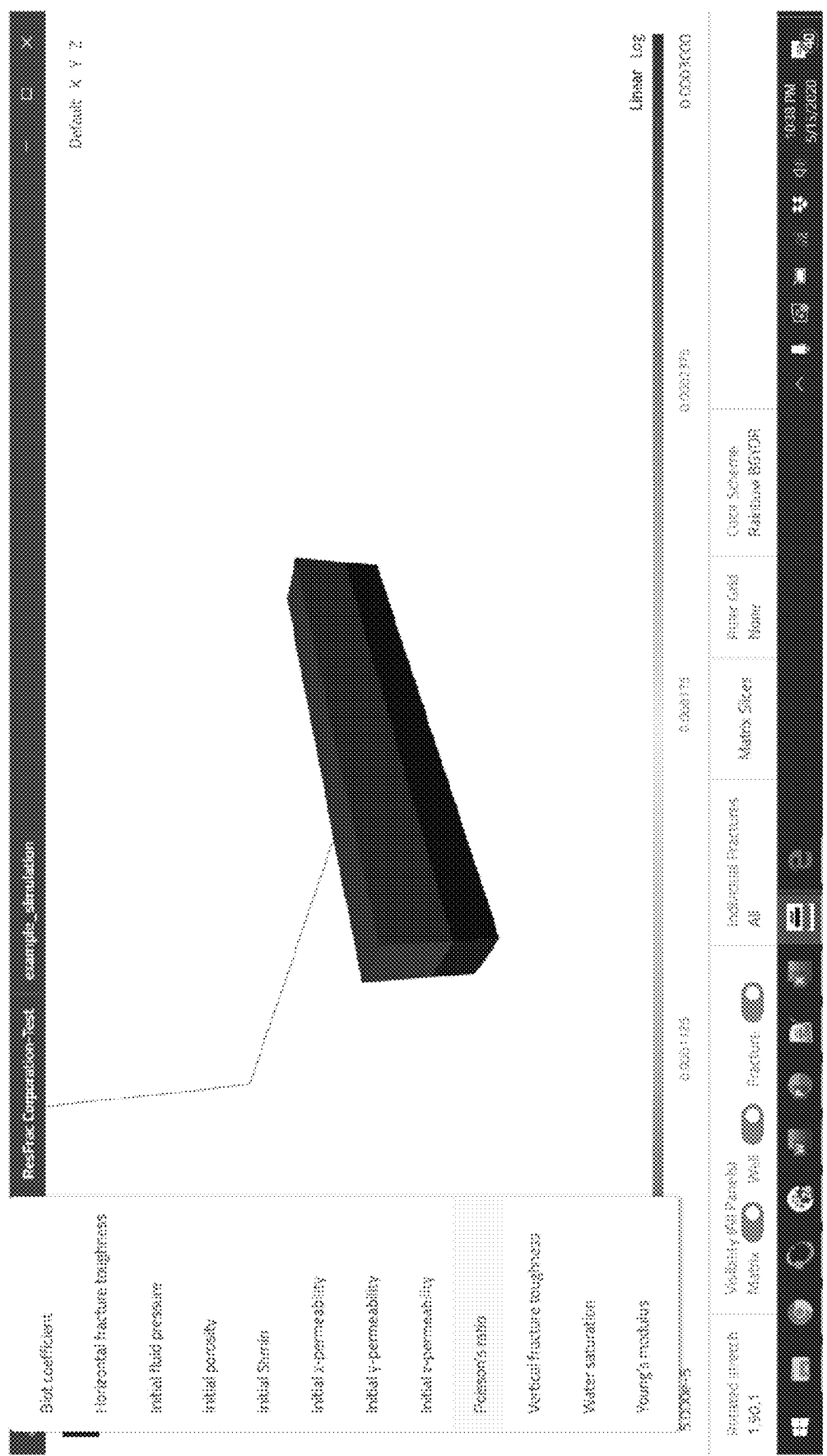
FIG. 15 shows an example of a 3D preview window provided by the 3D visualization tool.

FIG. 15 shows an example of a 3D preview window provided by the 3D visualization tool. Users may provide inputs via the GUI including, for example, to choose black oil or compositional, thermal or isothermal, dual porosity or single porosity, poroelastic or not, thermoelastic or not, rotated mesh or not, and various other inputs. One or more options may be automatically provided to a user for selection. For example, if a simulation is thermal, the user may be prompted to specify injection temperature, formation thermal conductivity and heat capacity, the thermal gradient in the formation, and the like. In some cases, the validation functions are applied to only the 'visible' controls. The validation functions may assist the user in updating the simulation options. For example, if a user switches to 'Thermal' from 'Isothermal', a validation window may pop up and display 'errors' to show changes are required to provide information relevant to the thermal option. As shown in the example, the 3D visualization tool allows the user to decide what to visualize and provides a variety of intuitive options to customize the view. This 3D preview viewer is a simplified version of the visualization tool used for full simulations.

Figure 16:
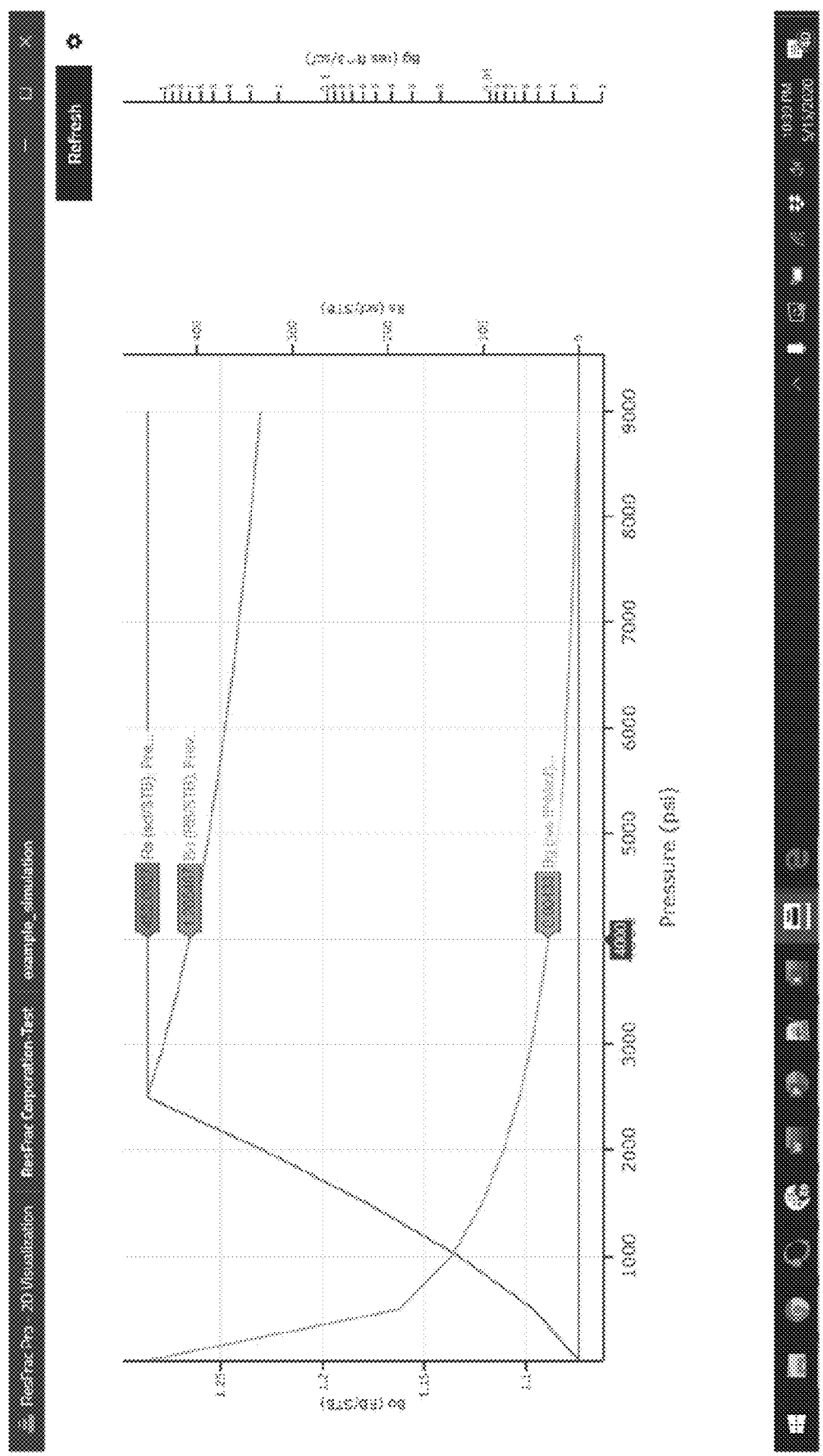
FIG. 16 shows an example of a GUI displaying 2D plot.

FIG. 16 shows an example of a GUI displaying 2D plot. In some cases, the simulator may provide windows for 2D plotting. Some of these 2D plots reproduce the user input. In some cases, the 2D plots may perform complex calculations to derive quantities from the user inputs. The 2D plotting tool may provide options for customization, such as the ability to use multiple y-axes, log or Cartesian, change line color and style, change font size, and the like.

Figure 17:
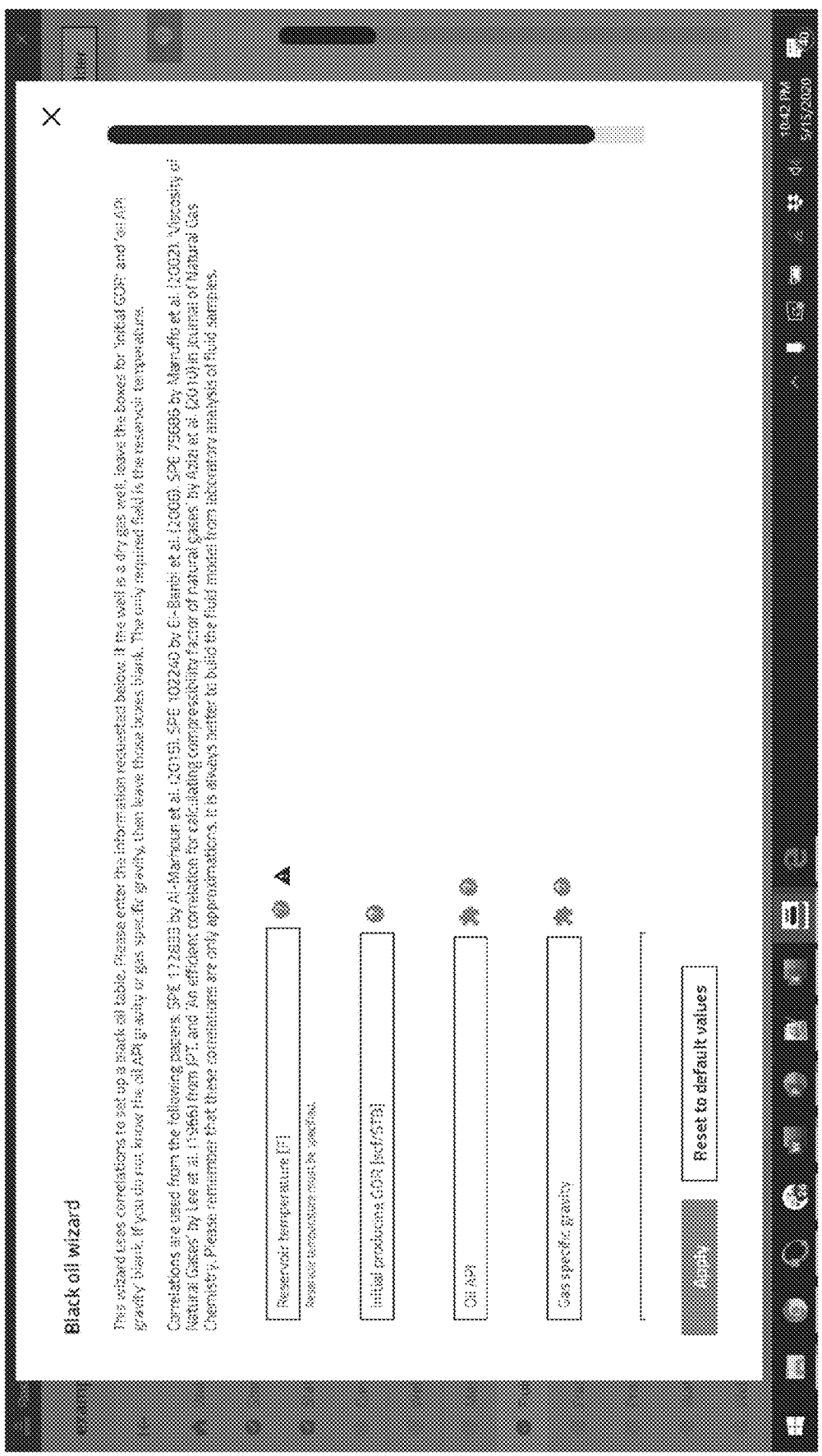
FIG. 17 shows an example of wizards provided by the simulation builder.

FIG. 17 shows an example of wizards provided by the simulation builder. The wizards may facilitate the process of setting up a simulation, and/or fill gaps in data. For example, the black oil wizard shown in the example uses correlations to set up a black oil table (or modified black oil table) based on high-level inputs such as reservoir temperature and initial GOR. The wizards may be provided for various processes or functions such as importing and upscaling formation properties, setting up black oil and compositional fluid models, importing wellbore surveys, setting up injection stages and perforations, setting up the simulation mesh, setting up pressure dependent permeability, setting up proppants, setting up injection fluids, and setting up production boundary condition controls. The wizards may be supplemented by the built-in 2D plotting tools that allow the user to preview their inputs.

Figure 18:
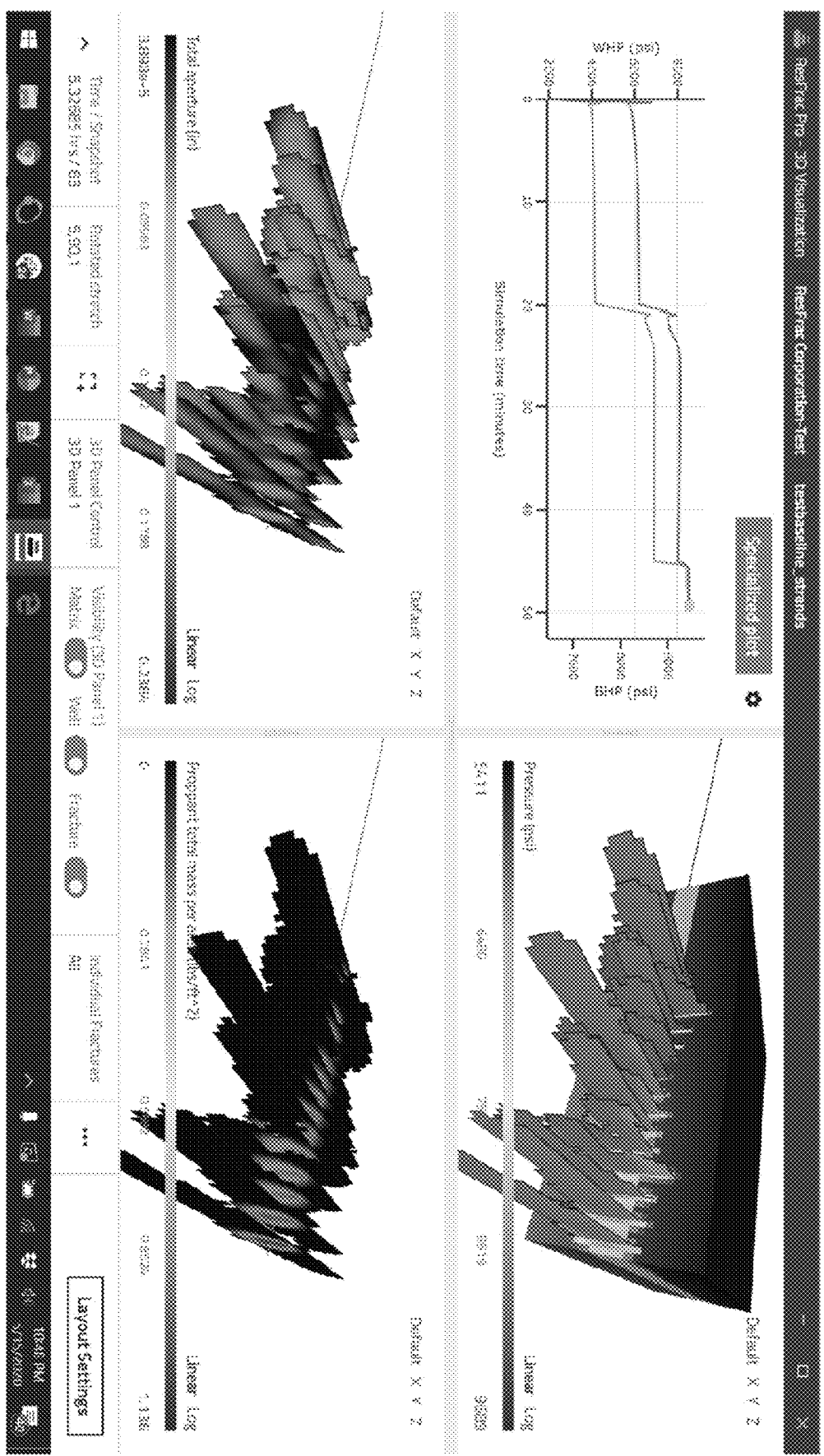
FIG. 18 shows another visualizing results from a simulation where a user can customize the visualization of the results.

FIG. 18 shows another visualizing results from a simulation where a user can customize the visualization of the results. A user may be provided with a list of options to customize the visualization. For instance, the visualization result can be displayed in one to six separate visualization panels, with either line plots or 3D images. In each 3D panel, a user can link or decouple the camera angle. A user may select from a wide range of properties to visualize. For example, a user can toggle visibility for wells, fractures, matrix, individual fractures, the colorbar, the 3D axis, etc. A user may cut slices through the matrix to see the inside.

Figure 19:
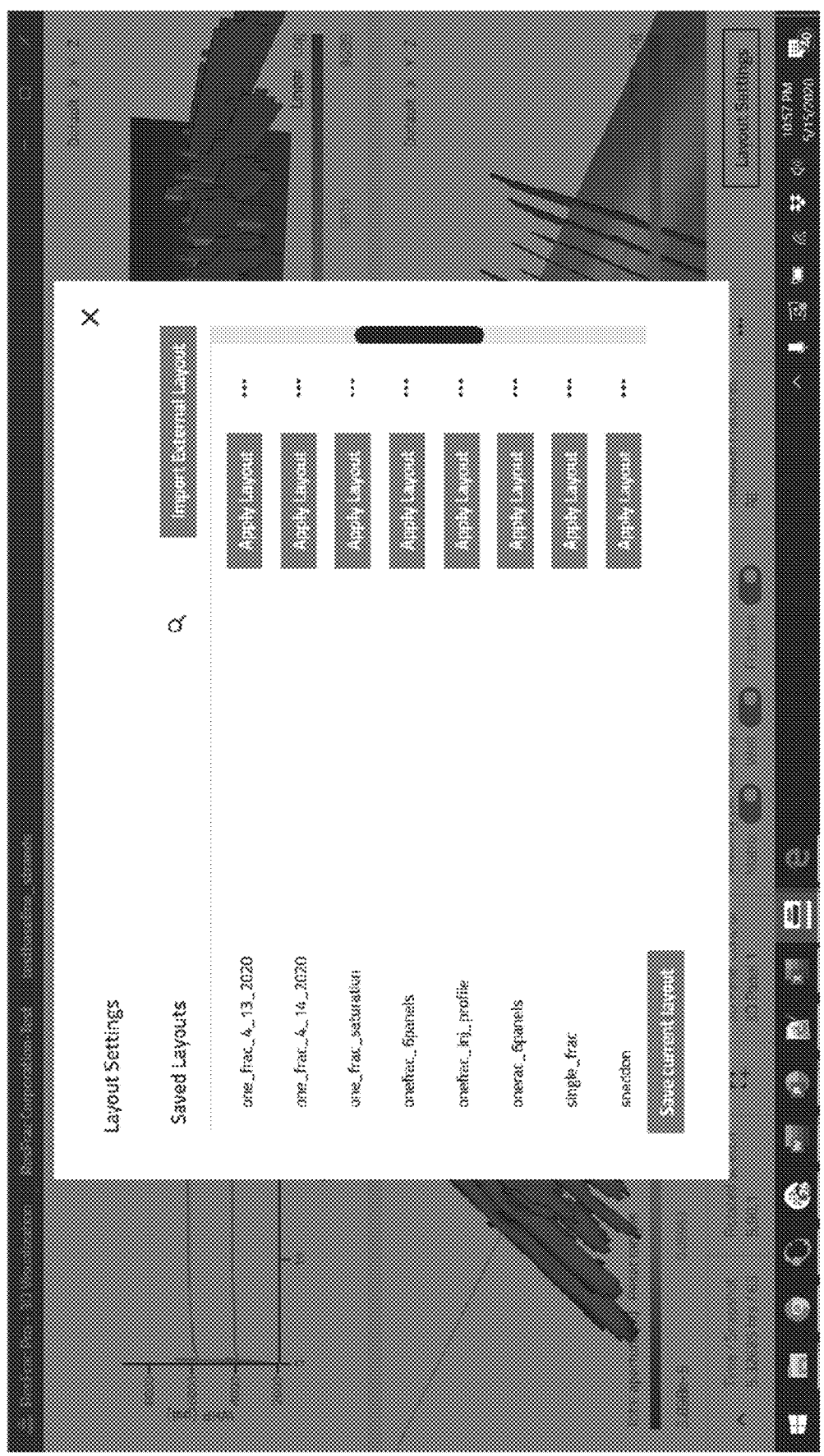
FIG. 19 shows an example of a GUI for saving a layout that stores the appearance of the plot.

A user can customize the appearance of the 2D preview plots provided by the simulation builder. A user may be permitted to import external datasets and plot them simultaneously with the simulated data. For example, during history matching, a user may plot the actual production data against simulated results. FIG. 19 shows an example of a GUI for saving a layout that stores the appearance of the plot. This may be used speed up visualization. For instance, a user may open a visualization with a layout selected from previously stored layouts. The layout may include data such as the imported external dataset, making it easy to history match. It should be noted that the UI examples are for illustration purpose. Various other information can be display the GUI. For instance, the GUI may display information about the simulations that are used to effect control of drilling (e.g., determining location of drilling, fracking, etc.), the parameters that are adjusted and various others.

Referring back to FIG. 12, user device 1201 associated with a user 1203 may be a computing device configured to perform one or more operations (e.g., rendering a user interface for submitting a simulation, setting up a simulation, visualizing simulation processes and results, etc.). Examples of user devices may include, but are not limited to, laptop or notebook computers, desktop computers, mobile devices, smartphones/cellphones, wearable device (e.g., smartwatches), tablets, personal digital assistants (PDAs), media content players, virtual reality systems, augmented reality systems, microphones, or any electronic device capable of analyzing, receiving (e.g., receiving user input data, etc.), providing or displaying certain types of data (e.g., GUI, etc.) to a user. The user device may be a handheld object. The user device may be portable. The user device may be carried by a human user. In some cases, the user device may be located remotely from a user, and the user can control the user device using wireless and/or wired communications. The user device can be any electronic device with a display.

The user device may be a network device capable of connecting the network, such as a local area network (LAN), wide area network (WAN) such as the Internet, a telecommunications network, a data network, or any other type of network. The user device may be capable of direct or indirect wireless communications. The user device may be capable of peer-to-peer (P2P) communications and/or communications with cloud-based infrastructure. The user device may be used to simulate hydraulic fracture at the site of hydraulic fracture (e.g., at the well) or may be used remotely (e.g., away from the well).

User device 1201 may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). The GUI may provide various functions and interfaces as described above. The user device may also be configured to display webpages and/or websites on the Internet. One or more of the webpages/websites may be hosted by server 1220 and/or rendered by the system as described above.

User device 1201, remote system 1220, remote monitoring and simulation system 1221, may be connected or interconnected to one or more database 1209, 1223. The databases may be one or more memory devices configured to store data. Additionally, the databases may also, in some embodiments, be implemented as a computer system with a storage device. In one aspect, the databases may be used by components of the network layout to perform one or more operations consistent with the disclosed embodiments. One or more local databases, and cloud databases of the platform may utilize any suitable database techniques. For instance, structured query language (SQL) or "NoSQL" database may be utilized for storing the simulation data, sensor data, algorithms and various other data as described elsewhere herein. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. In some embodiments, the database may include a graph database that uses graph structures for semantic queries with nodes, edges and properties to represent and store data. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some embodiments, the platform may construct the database for fast and efficient data retrieval, query and delivery. For example, the platform may provide customized algorithms to extract, transform, and load (ETL) the data.

Network 1210 may be a network that is configured to provide communication between the various components illustrated in FIG. 12. The network may be implemented, in some embodiments, as one or more networks that connect devices and/or components in the network layout for allowing communication between them. Direct communications may be provided between two or more of the above components. The direct communications may occur without requiring any intermediary device or network. Indirect communications may be provided between two or more of the above components. The indirect communications may occur with aid of one or more intermediary device or network. For instance, indirect communications may utilize a telecommunications network. Indirect communications may be performed with aid of one or more router, communication tower, satellite, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, 5G or Long Term Evolution (LTE) protocols, Infra-Red (IR) communication technologies, and/or Wi-Fi, and may be wireless, wired, or a combination thereof. In some embodiments, the network may be implemented using cell and/or pager networks, satellite, licensed radio, or a combination of licensed and unlicensed radio. The network may be wireless, wired, or a combination thereof.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for determining hydraulic fracture treatment of a production well, comprising:
   (a) receiving one or more input parameters for a production well, wherein at least one of the one or more input parameters are based on data from an integrated three-dimensional (3-D) model of a calibration well;
   (b) simultaneously simulating crack propagation and fluid transport through simulated cracks in the production well by performing an integrated 3-D simulation of hydraulic fracturing and fluid flow in a wellbore and reservoir of the production well based on the one or more input parameters for the production well, wherein performing the integrated 3-D simulation comprises:
      i) creating an integrated 3-D model representative of the hydraulic fracturing and the fluid flow in the wellbore and the reservoir of the production well;
      ii) adaptively treating a component of a matrix element, a fracture element, and a wellbore element of the integrated 3-D model as an explicit component or an implicit component with respect to a time step to simultaneously solve the matrix element, the fracture element, and the wellbore element during the crack propagation and fluid transport; and
   (c) outputting the hydraulic fracture treatment of the production well based on the integrated 3-D simulation of hydraulic fracturing and fluid flow in the wellbore and reservoir of the production well.

2. The method of claim 1, wherein the component of the matrix element, the fracture element, and the wellbore element of the integrated 3-D model is adaptively treated as the explicit component or the implicit component based on numerical instability of the component.

3. The method of claim 1, wherein the one or more input parameters comprise one or more hydraulic fracture treatment conditions of the production well.

4. The method of claim 3, wherein the one or more hydraulic fracture treatment conditions of the production well include (i) spacing of perforation clusters, (ii) spacing between wells, (iii) amount of proppant injected into a perforation cluster, (iv) injection rate, (v) injection volume, (vi) length of each stage along the production well, (vii) type of proppant injected, (viii) type of fluid injected, (ix) sequencing of fluid and proppant injection during a stage, or (x) sequencing of injection stages.

5. The method of claim 3, wherein the one or more hydraulic fracture treatment conditions of the production well are provided in an input file.

6. The method of claim 5, wherein the input file is generated by a user with the assistance of a graphical user interface.

7. The method of claim 1, wherein the calibration well is disposed adjacent to or in the same geological formation as the production well.

8. The method of claim 1, wherein the integrated 3-D model of the calibration well is created by adaptively treating a component of the integrated 3-D model of the calibration well as explicit or implicit with respect to a time step.

9. The method of claim 1, wherein the one or more input parameters are provided in an input file.

10. The method of claim 1, wherein the one or more input parameters comprise a model parameter modified based on the data from the integrated 3-D model of a calibration well.

11. The method of claim 10, wherein the model parameter is modified based on a comparison between the model parameter and a production data from the integrated 3-D model of a calibration well.

12. The method of claim 11, wherein the production data includes production rate, production pressure, injection pressure during fracturing, or fracture length.

13. The method of claim 1, wherein the integrated 3-D model representative of the hydraulic fracturing and the fluid flow in the wellbore and the reservoir of the production well provides a sensitivity analysis for the geological data.

14. The method of claim 13, wherein the geological data includes permeability or fracture conductivity.

15. The method of claim 1, wherein the integrated 3-D model representative of the hydraulic fracturing and the fluid flow in the wellbore and the reservoir of the production well assesses which of the one or more input parameters have the largest impact on performance of the integrated 3-D simulation.

16. The method of claim 1, further comprising displaying to a user via a graphical user interface one or more output properties representing the response and state of the production well at a given time.

17. The method of claim 16, wherein the one or more output properties are selected from the group consisting of fluid pressure, temperature, fluid saturation, molar composition, fluid phase density, fluid phase viscosity, proppant volume fraction, and fracture aperture.

18. The method of claim 1, wherein the one or more input parameters comprise production boundary conditions.

19. The method of claim 1, further comprising solving the explicit component to obtain explicit variables, using the explicit component and the explicit variables to solve the implicit component, and using numerical differentiation to approximate derivatives of the implicit component to obtain implicit variables.

20. The method of claim 19, further comprising evaluating the implicit component after substitution of the explicit component into the implicit component.

* * * * *